United States Patent
Ohno

(10) Patent No.: US 12,066,161 B2
(45) Date of Patent: Aug. 20, 2024

(54) VEHICLE HEADLAMPS

(71) Applicant: KOITO MANUFACTURING CO., LTD., Tokyo (JP)

(72) Inventor: Tomoyuki Ohno, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/275,476

(22) PCT Filed: Feb. 3, 2022

(86) PCT No.: PCT/JP2022/004319
§ 371 (c)(1),
(2) Date: Aug. 2, 2023

(87) PCT Pub. No.: WO2022/168926
PCT Pub. Date: Aug. 11, 2022

(65) Prior Publication Data
US 2024/0110685 A1 Apr. 4, 2024

(30) Foreign Application Priority Data
Feb. 4, 2021 (JP) ................................. 2021-016936

(51) Int. Cl.
*F21S 41/663* (2018.01)
*F21S 41/143* (2018.01)
(Continued)

(52) U.S. Cl.
CPC ........... *F21S 41/663* (2018.01); *F21S 41/143* (2018.01); *F21S 41/153* (2018.01); *F21S 41/25* (2018.01);
(Continued)

(58) Field of Classification Search
CPC ............... B60Q 1/12; B60Q 2300/054; B60Q 2300/122; F21S 41/143–155;
(Continued)

(56) References Cited

FOREIGN PATENT DOCUMENTS

| EP | 2 574 502 A1 | 4/2013 |
|---|---|---|
| JP | 2010-95205 A | 4/2010 |

(Continued)

OTHER PUBLICATIONS

International Search Report for PCT/JP2022/004319 dated Apr. 5, 2022.
(Continued)

*Primary Examiner* — Jason M Han
(74) *Attorney, Agent, or Firm* — Sughrue Mion, PLLC

(57) ABSTRACT

Vehicle headlights are equipped with a right-side lamp, a left-side lamp, and a control unit. A right-side light distribution pattern and a left-side light distribution pattern include an overlapping area and a non-overlapping area. In a case where the steering angle is greater than the prescribed angle, the control unit controls power supplied to light-emitting parts of the right-side lamp and power supplied to light-emitting parts of the left-side lamp such that: a first area of a first light distribution pattern is located in the non-overlapping area; a second area of a second light distribution pattern is located in the overlapping area; and a first intensity of the light in the first area becomes greater than the sum of a second intensity of the light in the second area and a third intensity of the light in the area overlapping the second area within the first light distribution pattern.

7 Claims, 12 Drawing Sheets

(51) Int. Cl.
    *F21S 41/153*    (2018.01)
    *F21S 41/25*     (2018.01)
    *F21S 41/43*     (2018.01)
    *F21W 102/155*   (2018.01)

(52) U.S. Cl.
    CPC ........ *F21S 41/43* (2018.01); *F21W 2102/155* (2018.01)

(58) Field of Classification Search
    CPC .......... F21S 41/25; F21S 41/43; F21S 41/663; F21W 2102/13–20
    See application file for complete search history.

(56) References Cited

FOREIGN PATENT DOCUMENTS

| | | | |
|---|---|---|---|
| JP | 2013-77451 | A | 4/2013 |
| JP | 2019-89494 | A | 6/2019 |
| JP | 2019-142403 | A | 8/2019 |

OTHER PUBLICATIONS

Written Opinion for PCT/JP2022/004319 dated Apr. 5, 2022.
Extended European Search Report dated Jan. 9, 2024 in European Application No. 22749797.1.

VEHICLE HEADLAMPS

CROSS REFERENCE TO RELATED APPLICATIONS

This application is a National Stage of International Application No. PCT/JP2022/004319 filed Feb. 3, 2022, claiming priority based on Japanese Patent Application No. 2021-016936 filed Feb. 4, 2021.

TECHNICAL FIELD

The present invention relates to vehicle headlights.

BACKGROUND ART

A plurality of light-emitting parts such as LEDs (Light Emitting Diodes) or LD (Laser Diodes) are sometimes used in a lamp of vehicle headlights. When light is emitted from each light-emitting part, a light distribution pattern is formed in front of the vehicle. For example, in a case where the light distribution pattern is a high-beam light distribution pattern, because the current supplied to the respective light-emitting parts is adjusted, a hot zone, which is an area having the highest intensity in the light distribution pattern, is capable of swiveling in a left-right direction. Such swiveling may be referred to as electronic swivel. In the vehicle headlights disclosed in Patent Literature 1 below, electronic swivel is performed by tracking a steering angle of a vehicle.

[Patent Literature 1] JP 2013-77451 A

SUMMARY OF INVENTION

Lamps are typically arranged on the left and right sides, respectively, of the front portion of a vehicle. When each lamp emits light, a light distribution pattern is formed. The light distribution pattern includes a right-side light distribution pattern formed by the light from the right-side lamp and a left-side light distribution pattern formed by the light from the left-side lamp. In this light distribution pattern, the right-side light distribution pattern may be arranged shifted to the right side with respect to the left-side light distribution pattern such that the left edge side of the right-side light distribution pattern overlaps the right edge side of the left-side light distribution pattern, the right edge side of the right-side light distribution pattern does not overlap the left-side light distribution pattern, and the left edge side of the left-side light distribution pattern does not overlap the right-side light distribution pattern.

When the vehicle is turning, the driver tends to direct their line of sight to the side where the vehicle is turning in order to see ahead. In a case where high beam is projected in such a situation, it may be preferable to use electronic swivel to brighten the side where the vehicle is turning in the high-beam light distribution pattern, in order to enhance the visibility of the vehicle turning side. For example, in a case where the vehicle turns right, the respective hot zones of each of the right-side light distribution pattern and the left-side light distribution pattern swivel rightward by tracking the steering angle. However, when the steering angle is too large, the hot zone of the left-side light distribution pattern may be located on the right edge of the left-side light distribution pattern, whereas the hot zone of the right-side light distribution pattern may be located on the right edge side of the right-side light distribution pattern not overlapping the left-side light distribution pattern. Therefore, the hot zone of the right-side light distribution pattern may be shifted to the right side of the hot zone of the left-side light distribution pattern. When the hot zone is shifted, two peaks may be formed in the intensity distribution of the high-beam light distribution pattern. When the two peaks are formed, in the high-beam light distribution pattern, the area corresponding to the valley portion of the intensity located between the two peaks is darker than the areas on both sides of the valley. When the area corresponding to the valley portion is located in front of the line of sight of the driver, the driver may recognize that part of the area in front of the line of sight has become darker than other portions and feel uncomfortable, and the visibility on the vehicle turning side may be reduced.

Therefore, an object of the present invention is to provide vehicle headlights capable of suppressing reduced visibility on a vehicle turning side in a case where electronic swivel is performed.

In order to achieve the foregoing object, the vehicle headlights of the present invention are equipped with a right-side lamp having a plurality of light-emitting parts, disposed on a right side of a vehicle, and forming, using light from the plurality of light-emitting parts, a right-side light distribution pattern constituting part of a high-beam light distribution pattern; a left-side lamp having a plurality of light-emitting parts, disposed on a left side of the vehicle, and forming, using light from the plurality of light-emitting parts on a left side of the right-side light distribution pattern, a left-side light distribution pattern constituting another part of the high-beam light distribution pattern; and a control unit that controls power supplied to each of the light-emitting parts of the right-side lamp and power supplied to each of the light-emitting parts of the left-side lamp such that an area having the highest light intensity in the right-side light distribution pattern and an area having the highest light intensity in the left-side light distribution pattern each move left and right in the respective light distribution patterns by tracking a steering angle of the vehicle, wherein each of the right-side light distribution pattern and the left-side light distribution pattern includes an overlapping area where the right-side light distribution pattern and the left-side light distribution pattern overlap each other and a non-overlapping area where the right-side light distribution pattern and the left-side light distribution pattern do not overlap each other, and wherein, in a case where the steering angle is greater than a prescribed angle, the control unit controls the power supplied to the respective light-emitting parts of the right-side lamp and the power supplied to the respective light-emitting parts of the left-side lamp such that: a first area, which has the highest light intensity in a first light distribution pattern, which is a light distribution pattern on a side where the vehicle is turning among the right-side light distribution pattern and the left-side light distribution pattern, is located in the non-overlapping area of the first light distribution pattern; a second area, which has the highest light intensity in a second light distribution pattern, which is a light distribution pattern on a side opposite to the side where the vehicle is turning among the right-side light distribution pattern and the left-side light distribution pattern, is located in the overlapping area; and a first intensity of light in the first area becomes greater than the sum of a second intensity of light in the second area and a third intensity of light in an area overlapping the second area within the first light distribution pattern.

In these vehicle headlights, in a case where the sum of a second intensity and a third intensity is equal to or greater than a first intensity, for example, two peaks are formed in a light intensity distribution of the light distribution pattern including a right-side light distribution pattern and a left-side light distribution pattern. When the two peaks are formed, the area corresponding to the valley of the intensity distribution located between the two peaks, in the light distribution pattern including the right-side light distribution pattern and the left-side light distribution pattern, is darker than the areas on both sides of the valley. Incidentally, in case where the vehicle is turning, the driver tends to direct their line of sight to the side where the vehicle is turning in order to see ahead. In a case where the steering angle is greater than a prescribed angle, when the area corresponding to the aforementioned valley and the area corresponding to both sides of the valley are located in front of the line of sight of the driver, the driver may recognize that part of the area in front of the line of sight has become darker than other portions and feel uncomfortable, and the visibility on the vehicle turning side may be reduced. In particular, when the valley is formed like a step, it is even more difficult to visually recognize. However, in the above configuration, because the first intensity is higher than the sum of the second intensity and the third intensity, the intensity distribution of the light distribution pattern including the right-side light distribution pattern and the left-side light distribution pattern can be gradually lowered as the distance from the peak increases in the left-right direction. Therefore, formation of the valley can be suppressed, the driver can be prevented from feeling uncomfortable, and reduced visibility on the side where the vehicle is turning can be suppressed.

Furthermore, in a case where the steering angle is greater than the prescribed angle, the control unit may control the power supplied to the respective light-emitting parts of the lamp on the opposite side, of the right-side lamp and the left-side lamp, such that the first intensity becomes higher than the light intensity in the overlapping area of the light distribution pattern including the right-side light distribution pattern and the left-side light distribution pattern.

In these vehicle headlights, in a case where the steering angle is greater than the prescribed angle and the light intensity in the overlapping area of the light distribution pattern including the right-side light distribution pattern and the left-side light distribution pattern is equal to or greater than the first intensity, the peak of the intensity distribution of the light distribution pattern including the right-side light distribution pattern and the left-side light distribution pattern may be formed on the center side of the light distribution pattern including the right-side light distribution pattern and the left-side light distribution pattern with respect to the side where the vehicle 10 is turning. In this case, from the viewpoint of the driver, the center side of the light distribution pattern including the right-side light distribution pattern and the left-side light distribution pattern becomes brighter than the side where the vehicle is turning and toward which the line of sight tends to be directed in a case where the vehicle is turning, and hence it becomes difficult to visually recognize the side where the vehicle is turning. However, in a case where, as in the above configuration, the first intensity is higher than the light intensity in the overlapping area, the side where the vehicle is turning can be brighter in the light distribution pattern including the right-side light distribution pattern and the left-side light distribution pattern, and the side where the vehicle is turning in the light distribution pattern including the right-side light distribution pattern and the left-side light distribution pattern can be brighter than the center side of the light distribution pattern including the right-side light distribution pattern and the left-side light distribution pattern. Therefore, the side where the vehicle is turning can be easily visually recognized.

Further, in a case where the steering angle is greater than the prescribed angle, the control unit may control the power supplied to the respective light-emitting parts of the lamp on the opposite side, such that the light intensity in the overlapping area of the first light distribution pattern becomes lower than the light intensity in the overlapping area of the second light distribution pattern.

In these vehicle headlights, in a case where the light intensity in the overlapping area of the first light distribution pattern is equal to or greater than the light intensity in the overlapping area of the second light distribution pattern, in the light distribution pattern including the right-side light distribution pattern and the left-side light distribution pattern, the center side of the light distribution pattern including the right-side light distribution pattern and the left-side light distribution pattern becomes brighter, from the viewpoint of the driver, than the side where the vehicle is turning in the light distribution pattern including the right-side light distribution pattern and the left-side light distribution pattern, and hence it may be difficult to visually recognize the side where the vehicle is turning. In comparison with this case, in a case where the light intensity in the overlapping area of the first light distribution pattern is lower than the light intensity in the overlapping area of the second light distribution pattern, the side where the vehicle is turning in the light distribution pattern including the right-side light distribution pattern and the left-side light distribution pattern can be brighter than the center side of the light distribution pattern including the right-side light distribution pattern and the left-side light distribution pattern. Therefore, in comparison with a case where the light intensity in the overlapping area of the second light distribution pattern is equal to or greater than the light intensity in the overlapping area of the first light distribution pattern, the side where the vehicle is turning can be easily visually recognized.

In addition, in a case where the steering angle is greater than the prescribed angle, the control unit may control the power supplied to the respective light-emitting parts of the lamp on the side where the vehicle is turning, among the right-side lamp and the left-side lamp, such that the first intensity becomes higher than in a case where the steering angle is equal to or less than the prescribed angle.

In these vehicle headlights, in a case where a third area having the highest light intensity in the light distribution pattern including the right-side light distribution pattern and the left-side light distribution pattern is located in an overlapping area, the intensity in the third area is the sum of the first intensity and the second intensity. However, in a case where the third area is located in a non-overlapping area of the first light distribution pattern, the intensity in the third area is the first intensity. If the first intensity is the same in the case where the third area is located in the overlapping area and the case where the third area is located in the non-overlapping area, the intensity in the third area is lower in a case where the third area is located in the non-overlapping area than in a case where the third area is located in the overlapping area. Therefore, it is difficult to visually recognize the side where the vehicle is turning. However, in the above configuration, in a case where the third area is located in the non-overlapping area, the first intensity is higher than in a case where the third area is located in the overlapping area. For this reason, in the light distribution pattern including the right-side light distribution pattern and the left-side light distribution pattern, the side where the vehicle is turning can be bright, and the side where the vehicle is turning can be easily visually recognized.

In addition, in a case where the steering angle is greater than the prescribed angle, the control unit may control the power supplied to the respective light-emitting parts of the lamp on the turning side, such that the light intensity in the non-overlapping area of the first light distribution pattern becomes higher than in a case where the steering angle is equal to or less than the prescribed angle and the first area is located in the overlapping area of the first light distribution pattern.

Further, the plurality of light-emitting parts of the right-side lamp and the plurality of light-emitting parts of the left-side lamp may be arranged in a matrix array.

Alternatively, the plurality of light-emitting parts of the right-side lamp and the plurality of light-emitting parts of the left-side lamp may be arranged in an array.

As described hereinabove, the present invention makes it possible to provide vehicle headlights capable of suppressing reduced visibility on a side where a vehicle is turning in a case where electronic swivel is performed.

DESCRIPTION OF EMBODIMENTS

Figure 1:
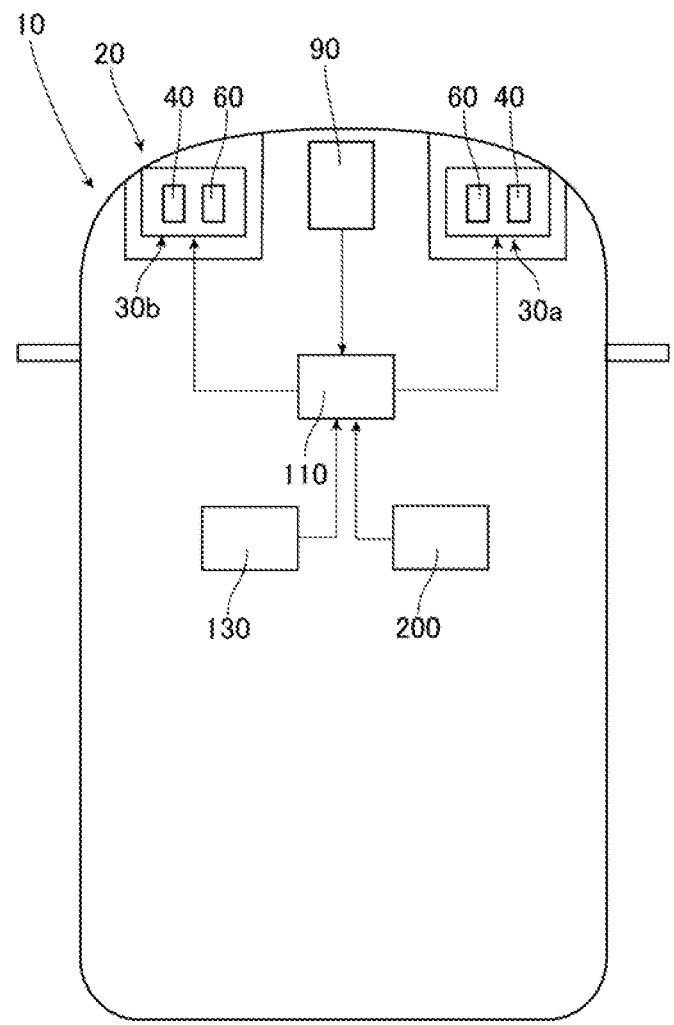
FIG. 1 is a schematic view illustrating an overall schematic configuration example of a vehicle of the present invention.

Preferred embodiments of vehicle headlights according to the present invention will be described in detail hereinbelow with reference to the drawings. The embodiments illustrated below are intended to facilitate understanding of the present invention and are not intended to be construed as limiting the present invention. The present invention can be modified and improved without deviating from the spirit thereof. Moreover, the present invention may also suitably combine constituent elements in each of the embodiments illustrated hereinbelow. Note that, in the drawings referred to below, the dimensions of each member may be changed in order to facilitate understanding.

FIG. 1 is a schematic view illustrating an overall schematic configuration example of a vehicle 10. As illustrated in FIG. 1, the vehicle 10 is equipped with vehicle headlights 20, a light switch 200, and a detection device 90. The vehicle headlights 20 according to the present embodiment are headlights for an automobile. The vehicle headlights 20 are mainly equipped with a pair of lamp units 30a and 30b arranged on the left and right of the front portion of the vehicle 10, respectively, a control unit 110 that controls the lamp units 30a and 30b, and a recording unit 130. Note that, in the present specification, "right" means the right side in the direction of travel of the vehicle 10, and "left" means the left side in the direction of travel of the vehicle 10.

The lamp units 30a and 30b emit a low beam or a high beam toward the front of the vehicle 10. In the following description, it is assumed that the lamp unit 30a is located on the right side of the vehicle 10 and the lamp unit 30b is located on the left side of the vehicle 10. The lamp units 30a and 30b have the same configuration except that the shapes are substantially symmetrical in the left-right direction. For this reason, the configurations of the lamp units 30a and 30b will be described hereinbelow using the lamp unit 30a.

The lamp unit 30a is equipped with a first lamp 40 and a second lamp 60. These lamps 40 and 60 are arranged side by side, the first lamp 40 being arranged on the outermost side of the vehicle 10, and the second lamp 60 being arranged on the centermost side of the vehicle 10. The arrangement order of the lamps 40 and 60 is not particularly limited.

Next, the first lamp 40 will be described with reference to FIG. 2.

Figure 2:
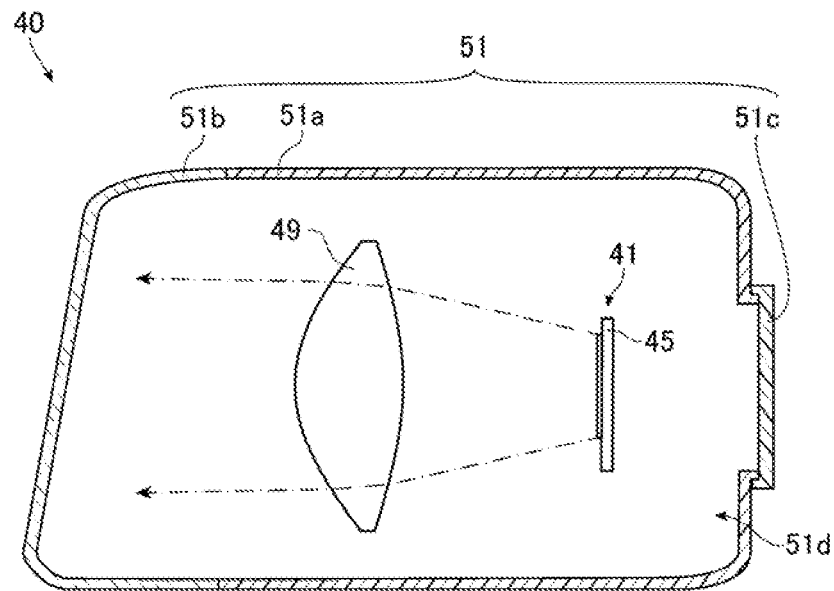
FIG. 2 is a side view schematically illustrating a first lamp illustrated in FIG. 1.

FIG. 2 is a side view schematically illustrating the first lamp 40 illustrated in FIG. 1. As illustrated in FIG. 2, the first lamp 40 is equipped with, as principal components, a first light source part 41 that emits first light forward, a projection lens 49 disposed in front of the first light source part 41, and a housing 51 that houses the first light source part 41 and the projection lens 49. In FIG. 2, the housing 51 is illustrated in a schematic cross-section in a vertical direction of the lamp unit 30a.

The housing 51 is equipped with, as principal components, a lamp housing 51a, a front cover 51b, and a back cover 51c. The front of the lamp housing 51a is open, and the front cover 51b is fixed to the lamp housing 51a so as to close the opening. An opening smaller than the front is formed behind the lamp housing 51a, and the back cover 51c is fixed to the lamp housing 51a so as to close the opening.

The lamp housing 51a, the front cover 51b that closes the front opening of the lamp housing 51a, and the back cover 51c that closes the rear opening of the lamp housing 51a form a lamp chamber 51d. The first light source part 41 and the projection lens 49 are arranged in the lamp chamber 51d. The front cover 51b is made of a material having translucency, and the first light emitted from the first light source part 41 passes through the front cover 51b via the projection lens 49. The lamp housing 51a and the back cover 51c are made of resin, for example.

Figure 3:
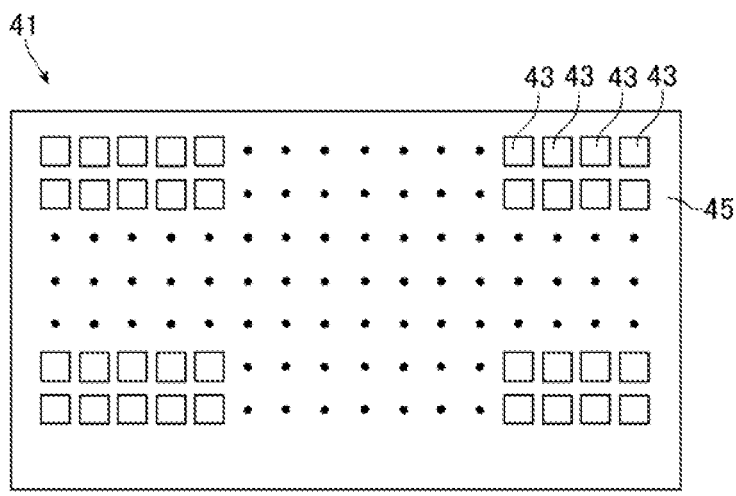
FIG. 3 is a front view schematically illustrating a first light source part illustrated in FIG. 2.

FIG. 3 is a front view schematically illustrating the first light source part 41 illustrated in FIG. 2. As illustrated in FIGS. 2 and 3, the first light source part 41 is equipped with, as principal components, a plurality of light-emitting parts 43 that emit first light, which is white light, forward, and a circuit board 45 whereon the plurality of light-emitting parts 43 are mounted. In FIG. 3, for the sake of visibility, only some of the light-emitting parts 43 are denoted by reference signs, and the reference signs of the remaining light-emitting parts 43 are omitted. Each of the light-emitting parts 43 is a micro LED (Light Emitting Diode). The respective light-emitting parts 43 are arranged in a matrix array to form rows in an up-down direction and a left-right direction, and the first light source part 41 is a so-called micro LED array. Ninety-six light-emitting parts 43 stand in a row in the left-right direction, and thirty-two light-emitting parts stand in a row in the up-down direction. Each of these light-emitting parts 43 is a self-emitting light-emitting part that emits first light.

The number of the light-emitting parts 43 is not particularly limited as long as the light-emitting parts 43 are arranged in a matrix. In addition, the shapes of the emission surfaces of the respective light-emitting parts 43 are substantially the same and are square, but are not particularly limited. The light-emitting parts 43 may each be LEDs that emit light of mutually different wavelengths, or may be laser diodes (LD) that emit light of mutually different wavelengths.

The light-emitting parts 43 emit the first light when a current is supplied from a power supply unit (not illustrated) via the circuit board 45. As a result, a light distribution pattern 400 (described subsequently) is projected in front of the vehicle 10.

The projection lens 49 is a lens that is disposed in front of the first light source part 41, receives the first light emitted from the first light source part 41, and adjusts a divergence angle of the first light incident on the projection lens 49. In the projection lens 49, the incident surface is formed in a convex shape toward the rear, and the emission surface is formed in a convex shape toward the front. The rear focal point of the projection lens 49 is located on or near the emission surface of any one of the light-emitting parts 43 in the first light source part 41. The first light, the divergence angle of which is adjusted by the projection lens 49, is emitted from the first lamp 40 toward the front of the vehicle 10 via the front cover 51b of the housing 51.

Next, the second lamp 60 will be described with reference to FIG. 4.

Figure 4:
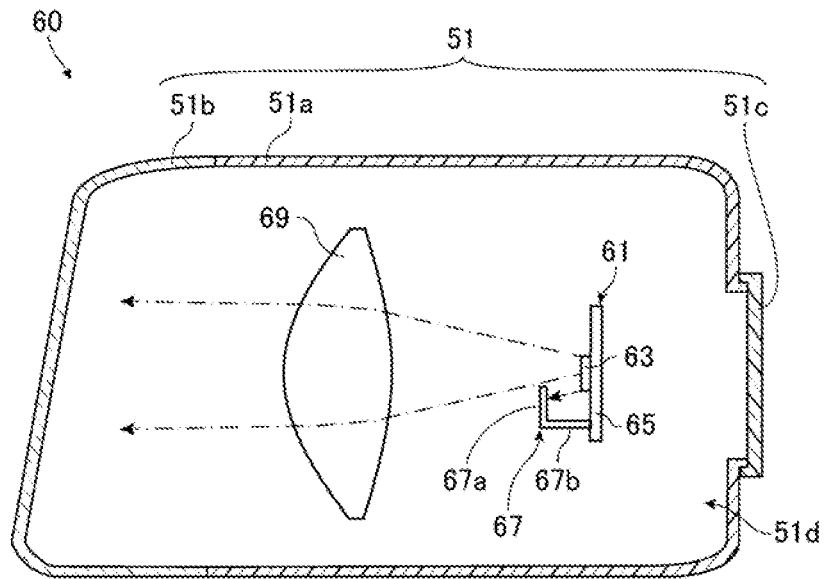
FIG. 4 is a side view schematically illustrating a second lamp illustrated in FIG. 1.

FIG. 4 is a side view schematically illustrating the second lamp 60 illustrated in FIG. 1. As illustrated in FIG. 4, the second lamp 60 is equipped with, as principal components, a second light source part 61 that emits second light forward, a shade 67, a projection lens 69 disposed in front of the second light source part 61, and a housing 51 that houses the second light source part 61, the shade 67, and the projection lens 69. In FIG. 4, the housing 51 is illustrated in a schematic cross-section of the second lamp 60 in the vertical direction.

Figure 5:
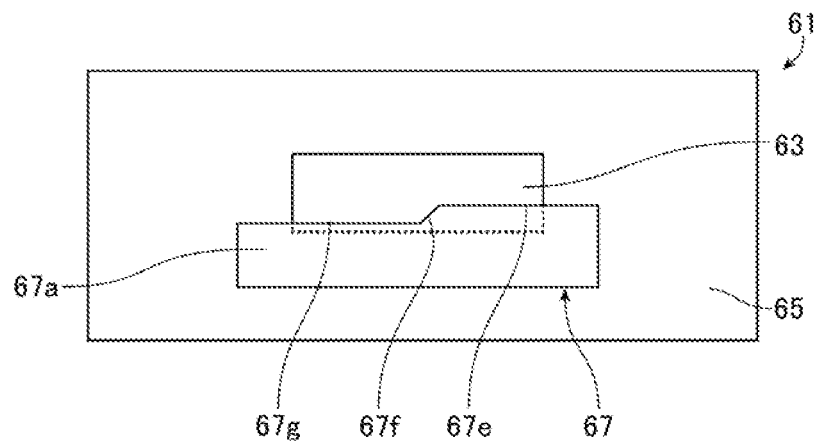
FIG. 5 is a front view schematically illustrating a second light source part and a shade which are illustrated in FIG. 4.

FIG. 5 is a front view schematically illustrating the second light source part 61 and the shade 67 which are illustrated in FIG. 4. As illustrated in FIGS. 4 and 5, the second light source part 61 is equipped with, as principal components, a light-emitting part 63 that emits second light, which is white light, and a circuit board 65 whereon the light-emitting part 63 is mounted. The light-emitting part 63 is a substantially rectangular LED in which an emission surface for emitting the second light forward is elongated in the left-right direction. This light-emitting part 63 is a self-emitting light-emitting part that emits second light. The emission surface of the light-emitting part 63 is greater than the emission surface of the light-emitting part 43 in the first light source part 41. Note that the shape of the emission surface of the light-emitting part 63 is not particularly limited, and the light-emitting part 63 may be an LD.

The shade 67 includes a light-shielding part 67a and a fixing part 67b. The light-shielding part 67a and the fixing part 67b are integrally formed by bending a plate-shaped member. The light-shielding part 67a extends in the left-right direction in front of the light-emitting part 63, and a fixing part 67b is connected to a lower end portion of the light-shielding part 67a. The fixing part 67b extends rearward from a lower end portion of the light-shielding part 67a, and an end portion of the fixing part 67b on the side opposite to the light-shielding part 67a side is fixed to the circuit board 65. An upper edge of the light-shielding part 67a is located below the optical axis of the light-emitting part 63. The upper edge of the light-shielding part 67a includes a first edge 67e, a second edge 67f, and a third edge 67g. The first edge 67e extends substantially in the horizontal direction. The second edge 67f linearly extends from an end on one side of the first edge 67e toward the side opposite to the first edge 67e side and obliquely downward to the left. The third edge 67g extends in the substantially horizontal direction from the end of the second edge 67f on the side opposite to the first edge 67e toward the side opposite to the first edge 67e. The light-shielding part 67a of this shade 67 blocks part of the second light emitted from the light-emitting part 63, and the other part of the second light is incident on the projection lens 69.

The projection lens 69 has the same configuration as the projection lens 49, is disposed in front of the shade 67, and the second light emitted from the second light source part 61 is incident on the projection lens. The rear focal point of the projection lens 69 is located at or near the upper edge of the light-shielding part 67a of the shade 67.

Returning to FIG. 1, the description of the vehicle 10 will be continued.

The recording unit 130 is electrically connected to the control unit 110. The recording unit 130 is, for example, a non-transitory recording medium, and is preferably a semiconductor recording medium such as a random-access memory (RAM) or a read-only memory (ROM), but may include a recording medium of any format such as an optical recording medium or a magnetic recording medium. Note that the "non-transitory" recording medium includes all computer-readable recording media except for a transitory, propagating signal, and does not exclude a volatile recording medium. The recording unit 130 stores information on the amount of light emitted from each light-emitting part 43. Examples of this information include a current value of each light-emitting part 43.

The control unit 110 includes, for example, an integrated circuit such as a microcontroller, an IC (Integrated Circuit), an LSI (Large-scale Integrated Circuit), an ASIC (Application Specific Integrated Circuit), or includes an NC (Numerical Control) device. In a case where an NC device is used, the control unit 110 may use a machine learning device or may not use a machine learning device. The control unit 110 may also be part of an ECU (Electronic Control Unit) (not illustrated) of the vehicle 10.

The light switch 200 is electrically connected to the control unit 110. The light switch 200 is a switch that selects any of emission of a low beam, emission of a high beam, and non-emission of light. For example, the light switch 200 outputs a control signal indicating emission of a low beam to the control unit 110 in a case where emission of a low beam is selected, and outputs a control signal indicating emission of a high beam to the control unit 110 in a case where emission of a high beam is selected. That is, in a case where the control signal from the light switch 200 is inputted, the control unit 110 drives the lamp units 30a and 30b according to the control signal. As described above, the control signal is a signal instructing the start of light emission from the lamp units 30a and 30b. In addition, the light switch 200 does not output the control signal to the control unit 110 in a case where non-emission of light is selected. In a case where the control signal is not inputted, the control unit 110 stops driving of the lamp units 30a and 30b.

The control unit 110 is electrically connected to a power supply unit (not illustrated). The power supply unit is electrically connected to the circuit boards 45 and 65. When the control signal from the light switch 200 is inputted, the control unit 110 stops the supply of the current or the supply of the current to the respective light-emitting parts 43 and 63 via the power supply unit and the circuit boards 45 and 65. As a result, the light-emitting parts 43 and 63 that emit light are selected, and the light distribution pattern formed by the light emitted from the lamp units 30a and 30b changes according to the selection. Furthermore, the control unit 110 controls the current supplied to each of the light-emitting parts 43 and 63 via the power supply unit and the circuit boards 45 and 65. The power to each of the light-emitting parts 43 and 63 is controlled by controlling the current. As a result, the amount of light emitted from the respective light-emitting parts 43 and 63 is adjusted, and the intensity distribution of the light in the light distribution patterns is adjusted.

The detection device 90 is electrically connected to the control unit 110. The detection device 90 is equipped with a steering sensor, and the steering sensor detects a rotation direction and a rotation angle of a steering wheel of the vehicle 10, that is, a direction in which the vehicle 10 turns and a steering angle of the vehicle 10. Therefore, the steering sensor detects the right steering angle and the left steering angle while identifying the right steering angle and the left steering angle as different steering angles. In a case where the steering angle is equal to or greater than 0° and equal to or less than the reference steering angle, the vehicle 10 is in a state of traveling straight. Assuming that the steering angle of the steering when the vehicle 10 travels straight is 0°, the reference steering angle is, for example, 3°. Further, in a case where the steering angle is greater than the reference steering angle, the vehicle 10 is in a state of turning. The steering sensor outputs, to the control unit 110, a signal indicating the direction in which the vehicle 10 is turning and the steering angle of the vehicle 10. Note that the steering sensor may be electrically connected to the control unit 110 via an ECU (not illustrated) of the vehicle 10, and a signal from the steering sensor may be inputted to the control unit 110 via the ECU.

Next, the low beam emitted from the vehicle headlights 20 will be described.

Figure 6:
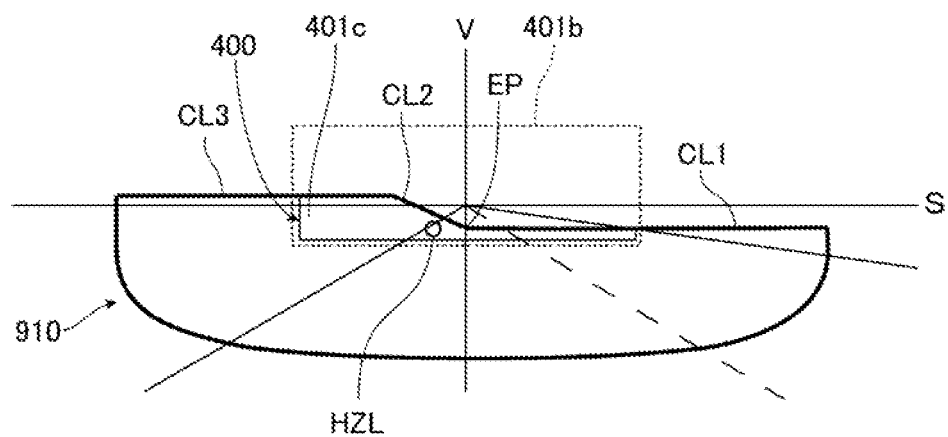
FIG. 6 is a view illustrating a low-beam light distribution pattern.

FIG. 6 is a view illustrating a low-beam light distribution pattern 910 according to the present embodiment. Hereinafter, in the view illustrating the light distribution pattern of FIG. 6 and the like, S represents a horizontal line, V represents a vertical line passing through the center of the vehicle 10 in the left-right direction, and the light distribution pattern will be described as being formed on a virtual vertical screen arranged 25 m ahead of the vehicle 10. The low-beam light distribution pattern 910 is formed by the first light emitted from the left and right first lamps 40 and the second light emitted from the left and right second lamps 60. In FIG. 6, the low-beam light distribution pattern 910 is indicated by a bold line.

The low-beam light distribution pattern 910 according to the present embodiment has, on an upper edge, cutoff lines CL1, CL2, and CL3. The cutoff line CL1 extends in the horizontal direction to the right side, which is one side in the left-right direction, from an elbow point EP located below the horizontal line S and on or near the vertical line V. The cutoff line CL2 extends obliquely upward from the elbow point EP to the left side which is the other side in the left-right direction. On the cutoff line CL2, an end on the side opposite to the elbow point EP side is located above the horizontal line S. The cutoff line CL3 extends in the horizontal direction from an end of the cutoff line CL2 on the side opposite to the elbow point EP side to the other side in the left-right direction. In addition, the hot zone HZL, which is an area having the highest light intensity in the low-beam light distribution pattern 910, is located in the vicinity of the elbow point EP.

The shapes of the cutoff lines CL1, CL2, and CL3 correspond to the edges 67e, 67f, and 67g that are the upper edges of the light-shielding part 67a of the shade 67. The outer shape of the low-beam light distribution pattern 910 substantially matches the outer shape of the light distribution pattern of the second light emitted from the second lamp 60. Further, the shape of the low-beam light distribution pattern 910 corresponds to the shape of the light-shielding part 67a, and is a light distribution pattern in which the light distribution pattern, when part of the second light is shielded by the light-shielding part 67a, is inverted in an up-down direction and left-right direction.

Incidentally, in FIG. 6, the irradiation area, in a case where the first light is emitted from all the light-emitting parts 43 in each of the left and right first lamps 40, is indicated by a broken line as an irradiation area 401b. The irradiation area 401b has a rectangular shape elongated in the left-right direction. The irradiation area 401b overlaps the horizontal line S and the vertical line V. The upper edge of the irradiation area 401b is located above the upper edge of the low-beam light distribution pattern 910 and the horizontal line S, and extends in the horizontal direction. Further, the lower edge of the irradiation area 401b is located below the horizontal line S, is located above the lower edge of the low-beam light distribution pattern 910, and extends in the horizontal direction. The position, orientation, and the like of the light-emitting parts 43 are adjusted such that the irradiation area 401b is arranged as described above.

In a case where the low beam is emitted, in the left and right first lamps 40, the first light is not emitted from all the light-emitting parts 43 in each of the left and right first lamps 40, and the first light is emitted from some of the light-emitting parts 43 in each of the left and right first lamps 40. In FIG. 6, an irradiation area in the case where the first light is emitted from some of the light-emitting parts 43 is defined as an irradiation area 401c. The irradiation area 401c is part of the irradiation area 401b, and the irradiation area 401c is illustrated inside the irradiation area 401b for the sake of visibility. The irradiation area 401c is an area inside the irradiation area 401b and below the cutoff lines CL1, CL2, and CL3 in the up-down direction. In a case where the low beam is emitted, in the irradiation area 401c, the light distribution pattern 400 is formed by the first light emitted from the left and right first lamps 40. The size and shape of the light distribution pattern 400 change according to the selection of the light-emitting parts 43 emitting the first light. The intensity distribution of the first light in the light distribution pattern 400 is adjusted by adjusting the amount of the first light emitted from each light-emitting part 43. The entire light distribution pattern 400 overlaps the low-beam light distribution pattern 910, and thus the irradiation area 401c is irradiated with not only the first light but also the second light. The irradiation area 401c includes a hot zone HZL. In the light distribution pattern 400, for example, the amount of the first light emitted from each light-emitting part 43 is adjusted by the control unit 110 such that the intensity decreases as the distance from the hot zone HZL increases. As the first light and second light are emitted from the lamps 40 and 60 in this manner, a low beam is emitted from the vehicle headlights 20. Note that the entire irradiation area 401c is not irradiated with the first light and the second light, and the entire irradiation area 401c may be irradiated with the second light. In this case, at least part of the irradiation area 401c may be irradiated with the first light, or the first lamp 40 may be turned off and the irradiation area 401c need not be irradiated with the first light.

Next, the high beam emitted from the vehicle headlights 20 will be described.

Figure 7:
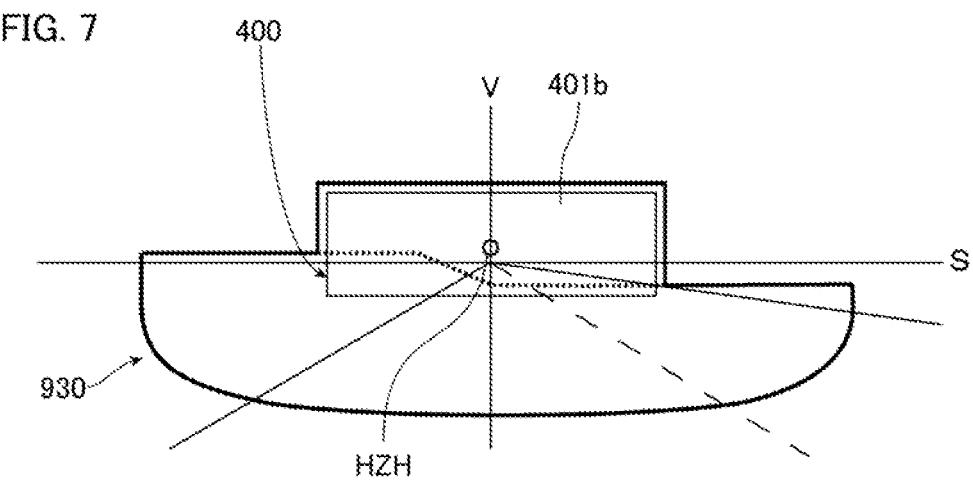
FIG. 7 is a view illustrating a high-beam light distribution pattern.

FIG. 7 is a view illustrating a high-beam light distribution pattern 930 according to the present embodiment. In FIG. 7, the high-beam light distribution pattern 930 is indicated by a bold line, and the irradiation area 401b is indicated by a solid line. For the sake of visibility, the irradiation area 401b is illustrated inside the light distribution pattern 930. According to the present embodiment, the hot zone HZH, which is the area having the highest light intensity in the high-beam light distribution pattern 930, is located on or near an intersection of the horizontal line S and the vertical line V, and overlaps the irradiation area 401b. FIG. 7 illustrates an example in which the hot zone HZH is located above the intersection of the horizontal line S and the vertical line V.

Similarly to the low-beam light distribution pattern 910, the high-beam light distribution pattern 930 is formed by the first light emitted from the left and right first lamps 40 and the second light emitted from the left and right second lamps 60. However, in the high-beam light distribution pattern 930, unlike the low-beam light distribution pattern 910, the first light is emitted from all the light-emitting parts 43 in the left and right first lamps 40. For this reason, the irradiation area 401b is irradiated with the first light from all the light-emitting parts 43, and a rectangular light distribution pattern 400 elongated in the left-right direction is formed. In addition, the second lamp 60 emits the same light as when forming the low-beam light distribution pattern 910. Therefore, the high-beam light distribution pattern 930 is formed by the light distribution pattern 400 and the low-beam light distribution pattern 910. Part of the light distribution pattern 400 overlaps the low-beam light distribution pattern 910, and the other parts do not overlap the low-beam light distribution pattern 910. A hot zone HZH, which is an area having the highest light intensity in the high-beam light distribution pattern 930, is located on or near the intersection of the horizontal line S and the vertical line V and overlaps the irradiation area 401b. FIG. 7 illustrates an example in which the hot zone HZH is located above the intersection of the horizontal line S and the vertical line V. The hot zone HZH is also a hot zone of the light distribution pattern 400. The light intensity distribution in the area overlapping the irradiation area 401b in the high-beam light distribution pattern 930 is, for example, a distribution in which the intensity decreases as the distance from the hot zone HZH increases. The amount of the second light emitted from each light-emitting part 43 is adjusted by the control unit 110 such that the light intensity in the irradiation area 401b has such a distribution. Because the first light and second light are emitted from the lamps 40 and 60 in this manner, a high beam is emitted from the vehicle headlights 20.

Next, the light distribution pattern 400 in the high-beam light distribution pattern 930 will be described.

Figure 8A:
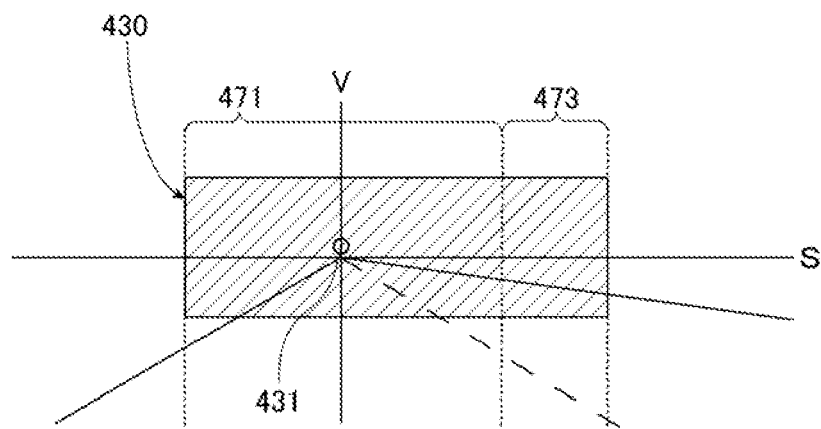
FIG. 8A is a view illustrating a position of a hot zone of a right-side light distribution pattern in a state where the vehicle is traveling straight.
Figure 8B:
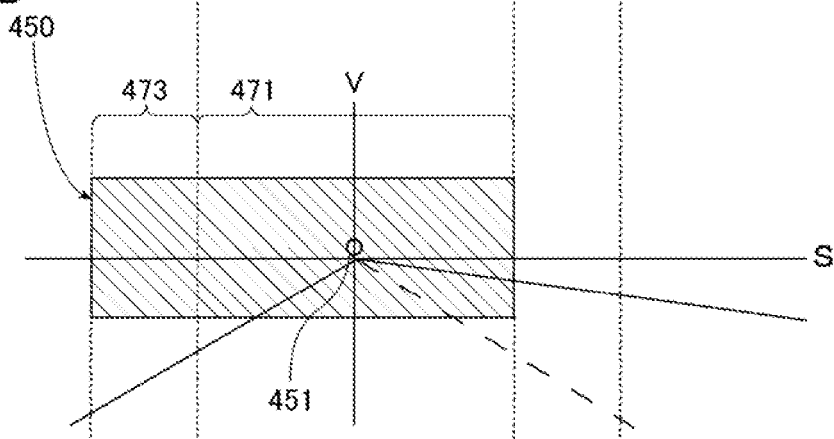
FIG. 8B is a view illustrating a position of a hot zone of a left-side light distribution pattern in a state where the vehicle is traveling straight.
Figure 8C:
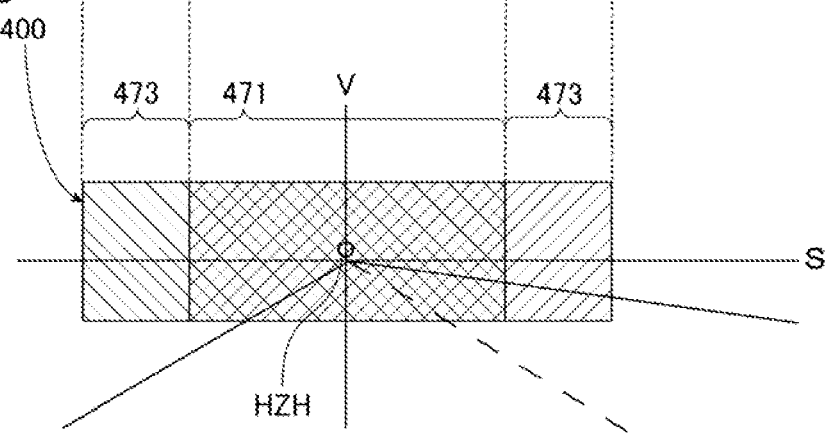
FIG. 8C is a view illustrating a position of a hot zone of a light distribution pattern in a state where the vehicle is traveling straight.

FIG. 8A is a view illustrating a right-side light distribution pattern 430 formed by the first light emitted from the right-side first lamp 40; and FIG. 8B is a view illustrating a left-side light distribution pattern 450 formed by the first light emitted from the left-side first lamp 40. FIG. 8C is a view illustrating a light distribution pattern 400 of the high-beam light distribution pattern 930. The right-side light distribution pattern 430 and the left-side light distribution pattern 450 have rectangular shapes elongated in the left-right direction, and are of the same size. The center of the right-side light distribution pattern 430 in the left-right direction is located on the right side of the V line, the center of the left-side light distribution pattern 450 in the left-right direction is located on the left side of the V line, and the center of the light distribution pattern 400 in the left-right direction is located on the V line. The light distribution pattern 400 illustrated in FIG. 8 is the same as the light distribution pattern 400 illustrated in FIG. 7, and is formed by overlapping the right-side light distribution pattern 430 and the left-side light distribution pattern 450. For this reason, in FIG. 8, the right-side light distribution pattern 430 and the left-side light distribution pattern 450 of the light distribution pattern 400 are illustrated by being shifted up and down. In addition, in the light distribution pattern 400, regarding the right-side light distribution pattern 430, the right-side light distribution pattern 430 is located in substantially the same height position as the left-side light distribution pattern 450, and is located on the right side of the left-side light distribution pattern 450. Furthermore, the right-side light distribution pattern 430 is formed shifted to the right side with respect to the left-side light distribution pattern 450 such that the left end side of the right-side light distribution pattern 430 overlaps the right end side of the left-side light distribution pattern 450, the right end side of the right-side light distribution pattern 430 does not overlap the left-side light distribution pattern 450, and the left end side of the left-side light distribution pattern 450 does not overlap the right-side light distribution pattern 430. Therefore, each of the right-side light distribution pattern 430 and the left-side light distribution pattern 450 includes an overlapping area 471 in which each of the light distribution patterns 430, 450 overlaps, and a non-overlapping area 473 in which each of the light distribution patterns 430, 450 does not overlap. The non-overlapping area 473 of the right-side light distribution pattern 430 can be regarded as an area where the first light from the left-side first lamp 40 having a light intensity lower than the prescribed light intensity of the first light from the left-side first lamp 40 forming the right end of the left-side light distribution pattern 450 overlaps the first light from the right-side first lamp 40. In addition, the non-overlapping area 473 of the left-side light distribution pattern 450 can be regarded as an area where the first light from the right-side first lamp 40 having a light intensity lower than the prescribed light intensity of the first light from the right-side first lamp 40 forming the left end of the right-side light distribution pattern 430 overlaps the first light from the left-side first lamp 40. Each non-overlapping area 473 can be regarded as an area where the first light emitted from the left and right first lamps 40 do not, to a human, visually overlap. The prescribed light intensity is, for example, 500 cd. The light distribution pattern 400 including the right-side light distribution pattern 430 and the left-side light distribution pattern 450 formed in this manner is part of the high-beam light distribution pattern 930. Note that the light distribution pattern 400 may be formed as at least part of the high-beam light distribution pattern 930.

Hereinafter, in the light distribution patterns 430, 450, 400, areas having the highest intensity of the first light are referred to as a right-side hot zone 431, a left-side hot zone 451, and a hot zone HZH. In addition, the right-side hot zone 431 may be referred to as a first area, and the left-side hot zone 451 may be referred to as a second area. The positions of the hot zones 431, 451, and HZH illustrated in FIG. 8 indicate positions in a state where the vehicle 10 is traveling straight. As described above, in a state where the vehicle 10 is traveling straight, the steering angle is equal to or less than the reference steering angle. In a state where the vehicle 10 is traveling straight, the hot zones 431 and 451 are located on the V line. In this case, because the hot zone HZH is formed through the synthesis of the hot zones 431 and 451, the hot zone HZH is located on the V line similarly to the hot zones 431 and 451. In the light distribution patterns 430, 450, and 400, the intensity gradually decreases as the distance from the hot zones 431, 451, and HZH increases.

Figure 9A:
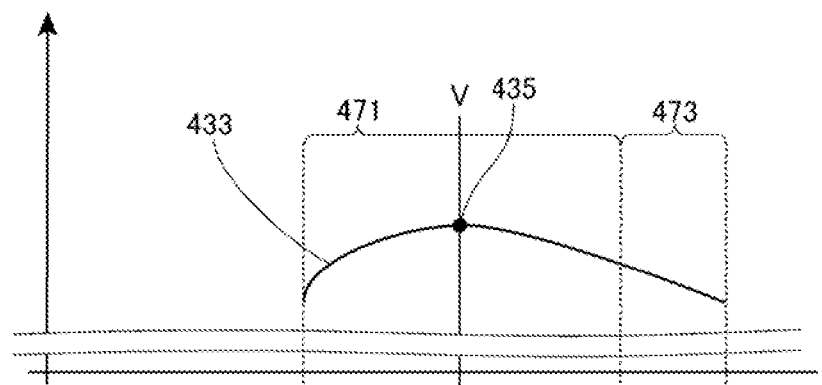
FIG. 9A is a view illustrating a relative intensity distribution of first light in the left-right direction in the right-side light distribution pattern illustrated in FIG. 8A.
Figure 9B:
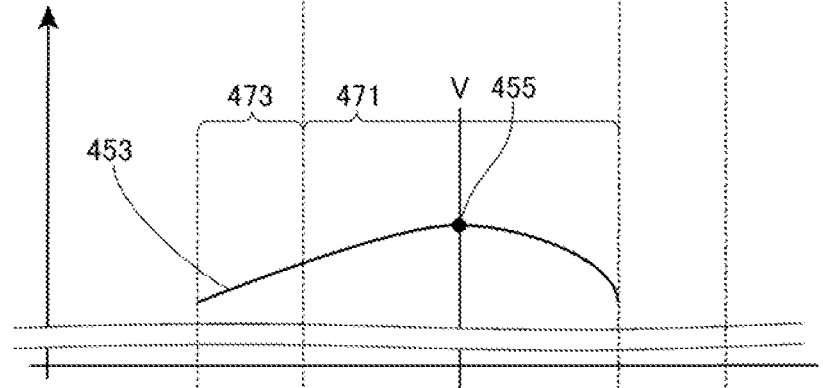
FIG. 9B is a view illustrating a relative intensity distribution of first light in the left-right direction in the left-side light distribution pattern illustrated in FIG. 8B.
Figure 9C:
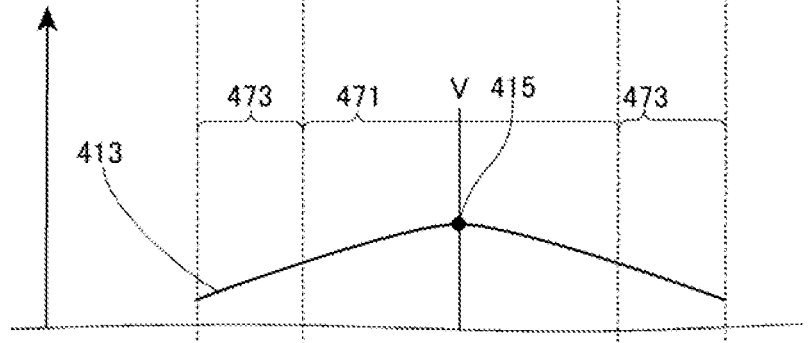
FIG. 9C is a view illustrating a relative intensity distribution of first light in the left-right direction in the light distribution pattern illustrated in FIG. 8C.

FIG. 9A is a view illustrating a relative intensity distribution 433 of the first light in the left-right direction in the right-side light distribution pattern 430 in a state where the vehicle 10 is traveling straight. FIG. 9B is a view illustrating a relative intensity distribution 453 of the first light in the left-right direction in the left-side light distribution pattern 450 in a state where the vehicle 10 is traveling straight. FIG. 9C is a view illustrating a relative intensity distribution 413 of the first light in the left-right direction in the light distribution pattern 400 in a state where the vehicle 10 is traveling straight. In FIG. 9, the vertical axis represents the relative intensity based on the maximum intensity, and the horizontal axis in FIG. 9 represents the position in the left-right direction. When the intensity distribution 433 and the intensity distribution 453 are synthesized by using the H line and the V line as a reference, the intensity distribution 413 is formed. In FIG. 9, the intensity distribution 413 is illustrated simply in order to facilitate understanding, and the intensity distribution 413 illustrated in FIG. 9 is not a distribution obtained by synthesizing the intensity distribution 433 illustrated in FIG. 9 and the intensity distribution 453 illustrated in FIG. 9.

In a state in which the vehicle 10 is traveling straight, the hot zones 431, 451, and HZH are located on the V line as described above, and thus, each peak 435, 455, and 415 is located on the V line in the intensity distributions 433, 453, and 413. The intensity at the peak 415 is the sum of the intensity at the peak 435 and the intensity at the peak 455. Furthermore, for example, in the overlapping area 471, the intensity in the intensity distribution 433 in a certain position separated rightward from the V line by a prescribed distance corresponds to the intensity in the intensity distribution 453 in a certain position separated rightward from the V line by the prescribed distance. When the respective intensities are synthesized, the intensities become the intensities in the intensity distribution 413 in a position separated rightward from the V line by a prescribed distance. Therefore, the intensity distribution in the overlapping area 471 of the intensity distribution 413 is an intensity distribution obtained by synthesizing the intensity distribution in the overlapping area 471 of the intensity distribution 433 and the intensity distribution in the overlapping area 471 of the intensity distribution 453. Further, in the intensity distribution 433, the intensity distribution in the non-overlapping area 473 of the right-side light distribution pattern 430 corresponds to the intensity distribution in the non-overlapping area 473 of the intensity distribution 413. Furthermore, in the intensity distribution 453, the intensity distribution in the non-overlapping area 473 of the left-side light distribution pattern 450 corresponds to the intensity distribution in the non-overlapping area 473 of the intensity distribution 413.

The intensity distributions 433, 453, and 413 gradually decrease as the distance from the peaks 435, 455, and 415 increases in the left-right direction. For example, the intensity distribution 413 of the light distribution pattern 400 may be substantially bilaterally symmetric with respect to the V line, and the intensity distribution 433 may be substantially bilaterally symmetric with respect to the intensity distribution 453. In addition, the intensity distribution 433 may be lowered from the peak 435 in a short range in the left-right direction further on the left side than the right side with respect to the V line. Further, the intensity distribution 453 may be lowered from the peak 455 in a short range in the left-right direction further on the right side than the left side by using the V line as a reference. The intensity distributions 433, 453, and 413 are not limited to those above.

Figure 10:
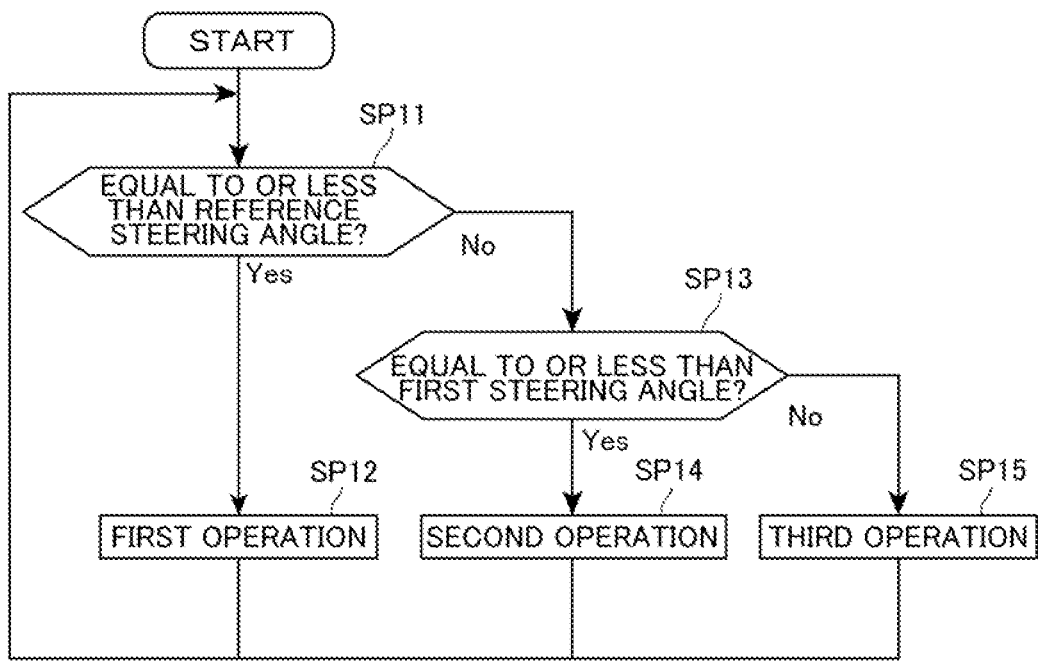
FIG. 10 is a view illustrating an example of a flowchart of control by a control unit.

Next, an operation of the control unit 110 according to the present embodiment, specifically, a high-beam electronic swivel control operation will be described. FIG. 10 is a view illustrating an example of a control flowchart of the control unit 110 according to the present embodiment. As illustrated in FIG. 10, the control flow according to the present embodiment includes steps SP11 to SP15.

In a starting state, the vehicle headlights 20 emit a high beam, and the high-beam light distribution pattern 930 including the light distribution pattern 400 is formed. The control unit 110 receives, as an input, a signal from a steering sensor of the detection device 90. This signal indicates a turning direction of the vehicle 10 and a steering angle of the vehicle 10.

(Step SP11)

In this step, the control unit 110 determines whether the steering angle is equal to or less than the reference steering angle, based on the signal from the steering sensor. The control unit 110 advances the control flow to step SP12 in a case where the steering angle is equal to or less than the reference steering angle, and advances the control flow to step SP13 in a case where the steering angle is greater than the reference steering angle.

(Step SP12)

In this step, the vehicle 10 travels straight, and the control unit 110 performs a first operation. In the first operation, the control unit 110 adjusts the current supplied to the respective light-emitting parts 43 of the left-side first lamp 40 and the respective light-emitting parts 43 of the right-side first lamp 40 such that the hot zones 431 and 451 are located on the line V as illustrated in FIG. 8 and the intensity distributions 433 and 453 illustrated in FIG. 9 are formed. When the current is adjusted, the amount of light emitted from each light-emitting part 43 is adjusted, and in this step, the hot zones 431 and 451 are located on the V line as illustrated in FIG. 8, and the intensity distributions 433 and 453 illustrated in FIG. 9 are formed. As a result, in the light distribution pattern 400, the hot zone HZH is located on the V line, and the intensity distribution 413 illustrated in FIG. 9 is formed. As described above, when controlling the current supplied to the light-emitting parts 43 of the left and right first lamps 40, the control unit 110 returns the control flow to step SP11.

(Step SP13)

In this step, the control unit 110 determines whether or not the steering angle is equal to or less than a first steering angle, which is a prescribed angle, on the basis of a signal from the steering sensor. The control unit 110 advances the control flow to step SP14 in a case where the steering angle is greater than the reference steering angle and equal to or less than the first steering angle, and advances the control flow to step SP15 in a case where the steering angle is the second steering angle, which is greater than the first steering angle.

The first steering angle and the second steering angle are angles having a greater tilt than the reference steering angle. Therefore, in steps SP14 and SP15, the vehicle 10 is in a state of turning and in this case, high-beam electronic swivel control is performed. In high-beam electronic swivel control, the control unit 110 controls the current supplied to the respective light-emitting parts 43 of the left-side first lamp 40 and the respective light-emitting parts 43 of the right-side first lamp 40 such that the right-side hot zone 431, which is the area having the highest intensity of the first light in the right-side light distribution pattern 430, and the left-side hot zone 451, which is the area having the highest intensity of the first light in the left-side light distribution pattern 450, each move left and right in the light distribution patterns 430 and 450, respectively, by tracking the steering angle of the vehicle 10 as detected by the steering sensor of the detection device 90, based on the time when the vehicle 10 is traveling straight. In this case, the control unit 110 increases or decreases the current supplied to the respective light-emitting parts 43 of the left and right first lamps 40, based on the signal inputted from the steering sensor of the detection device 90, and thus changes the intensity of the light emitted from the vehicle headlights 20. The higher the current, the higher the intensity. As the intensity changes, the intensity distribution 433, 453 changes. When the intensity distributions 433 and 453 change, the light distribution patterns 430 and 450 themselves do not swivel in the left-right direction, and the hot zones 431 and 451 move in the light distribution patterns 430 and 450 to the side where the vehicle 10 is turning, among the left and right sides. When the intensity distributions 433 and 453 change as described above and the hot zones 431 and 451 move, the intensity distribution 413 changes and the hot zone HZH also moves.

Hereinafter, among the right-side light distribution pattern 430 and the left-side light distribution pattern 450, the light distribution pattern on the side where the vehicle 10 is turning may be referred to as the first light distribution pattern, and among the right-side light distribution pattern 430 and the left-side light distribution pattern 450, the light distribution pattern on the side opposite to the side where the vehicle 10 is turning may be referred to as the second light distribution pattern. Furthermore, in the following description, a case where the vehicle 10 is turning to the right side is taken as an example, and in this case, the right-side light distribution pattern 430 is then the first light distribution pattern and the left-side light distribution pattern 450 is the second light distribution pattern. In addition, in a case where the vehicle 10 is turning to the right side, the first lamp 40 of the right-side lamp unit 30a becomes the lamp on the turning side, and the first lamp 40 of the left-side lamp unit 30b becomes the lamp on the side opposite to the turning side.

(Step SP14)

Figure 11A:
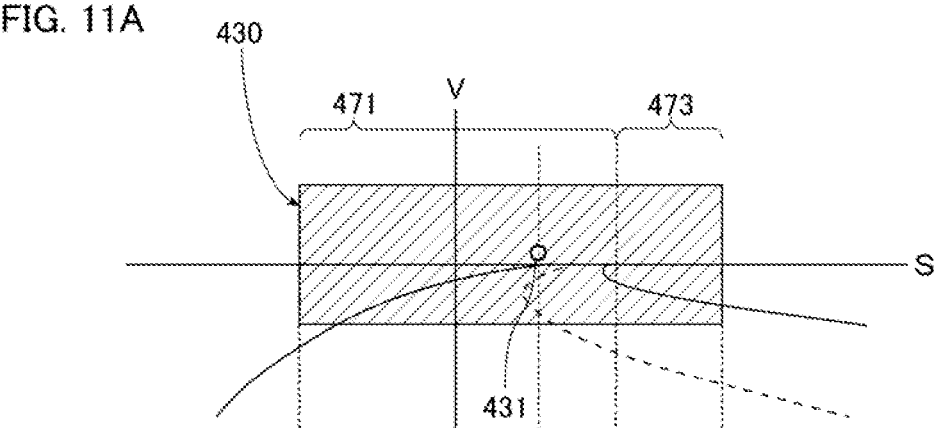
FIG. 11A is a view illustrating a position of a hot zone of a right-side light distribution pattern in a case where a steering angle is a first steering angle.
Figure 11B:
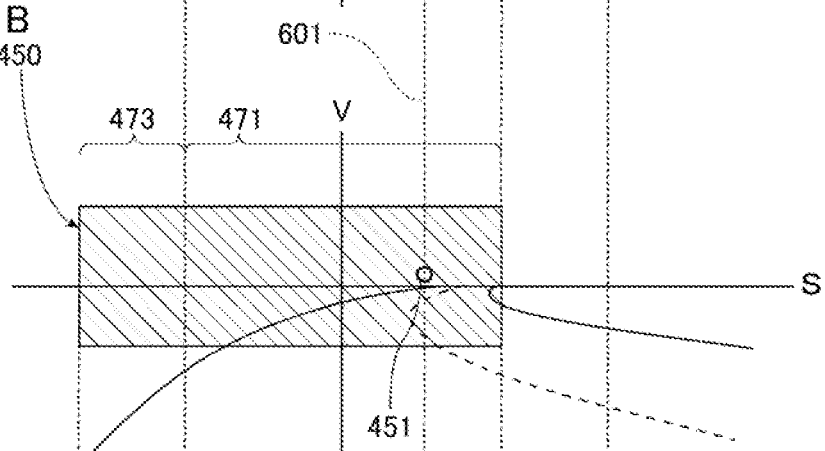
FIG. 11B is a view illustrating a position of a hot zone of a left-side light distribution pattern in a case where the steering angle is the first steering angle.
Figure 11C:
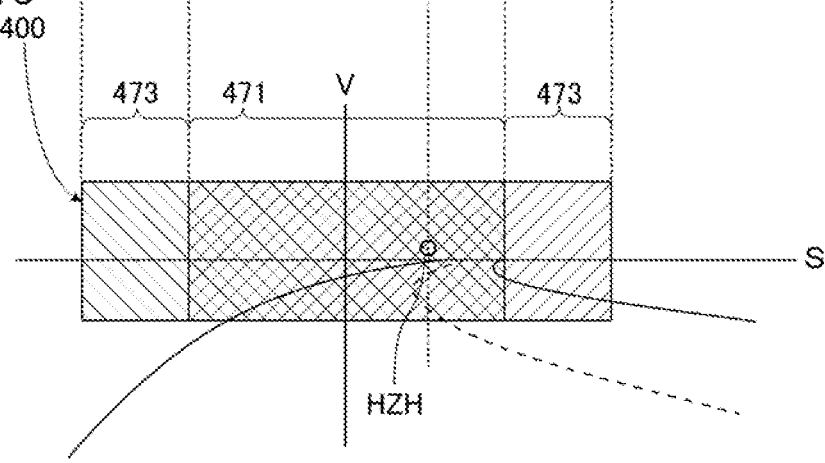
FIG. 11C is a view illustrating a position of a hot zone of a light distribution pattern in a case where the steering angle is the first steering angle.
Figure 12A:
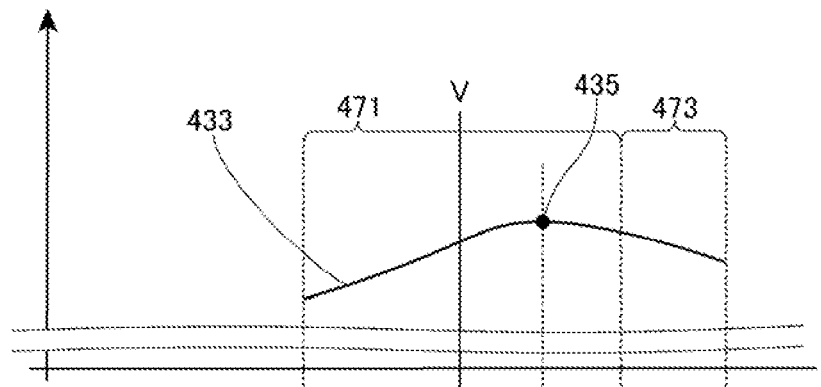
FIG. 12A is a view illustrating an intensity distribution of the right-side light distribution pattern illustrated in FIG. 11A.
Figure 12B:
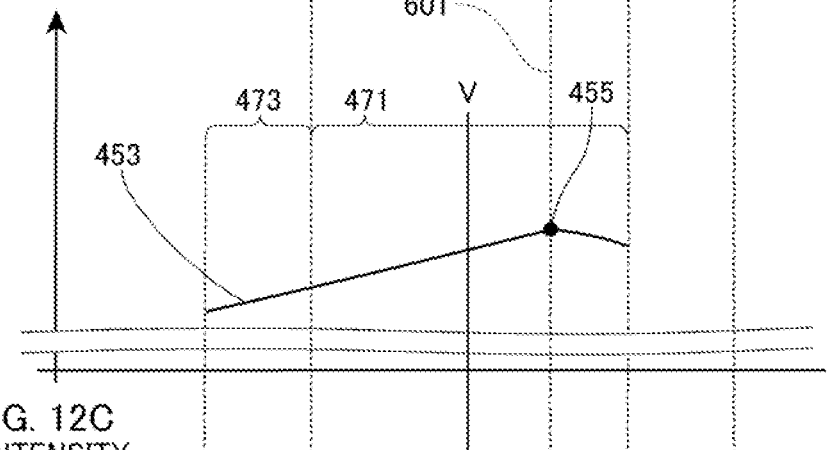
FIG. 12B is a view illustrating an intensity distribution of the left-side light distribution pattern illustrated in FIG. 11B.
Figure 12C:
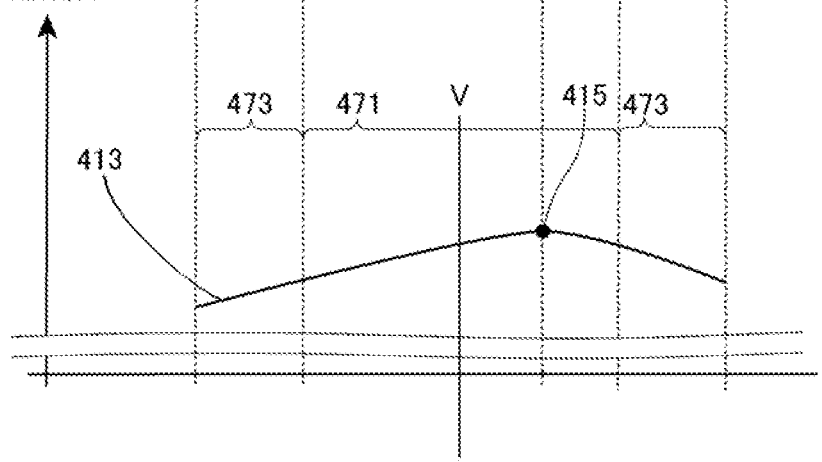
FIG. 12C is a view illustrating an intensity distribution of the light distribution pattern illustrated in FIG. 11C.

In this step, the control unit 110 performs a second operation. In the second operation, the control unit 110 controls, based on the first steering angle, the current supplied to the respective light-emitting parts 43 of the left-side first lamp 40 and the respective light-emitting parts 43 of the right-side first lamp 40. The first steering angle is an angle having a greater tilt in the clockwise direction than the reference steering angle, and is an angle at which the hot zones 431 and 451 are located in the overlapping area 471. This first steering angle is 5°, for example. FIG. 11A is a view illustrating the position of the hot zone 431 in a case where the steering angle is the first steering angle; and FIG. 11B is a view illustrating the position of the hot zone 451 in a case where the steering angle is the first steering angle. FIG. 11C is a view illustrating the position of the hot zone HZH in a case where the steering angle is the first steering angle. The light distribution patterns 430, 450, and 400 illustrated in FIG. 11 are the same as the respective patterns illustrated in FIG. 8, and the position of the light distribution patterns 430, 450, 400 with respect to the V line and the H line are the same as the positions in FIG. 8. FIG. 12A is a view illustrating the intensity distribution 433 in a case where the steering angle is the first steering angle; and FIG. 12B is a view illustrating the intensity distribution 453 in a case where the steering angle is the first steering angle. FIG. 12C is a view illustrating the intensity distribution 413 in a case where the steering angle is the first steering angle. In FIGS. 11 and 12, the positions of the hot zones 431, 451, and HZH in a case where the steering angle is the first steering angle are indicated by a broken line 601. As illustrated in FIG. 11, in the second operation, the hot zones 431, 451, and HZH are located in the overlapping area 471.

In the second operation, the control unit 110 adjusts the current supplied to the respective light-emitting parts 43 of the left-side first lamp 40 and the respective light-emitting parts 43 of the right-side first lamp 40 such that the hot zones 431 and 451 are located on the broken line 601, as illustrated in FIG. 11, and the intensity distributions 433 and 453 illustrated in FIG. 12 are formed. When the current is adjusted, the amount of light emitted from each light-emitting part 43 is adjusted, the hot zones 431 and 451 are located on the broken line 601, as illustrated in FIG. 11, and the intensity distributions 433 and 453 illustrated in FIG. 12 are formed. As a result, in the light distribution pattern 400, the hot zone HZH is located on the broken line 601, and the intensity distribution 413 illustrated in FIG. 12 is formed. In a case where the steering angle is the first steering angle, the hot zones 431, 451, and HZH are shifted rightward from the V line and are located on the broken line 601. Therefore, in comparison with the case where the steering angle is the reference steering angle, the peaks 435, 455, and 415 are shifted rightward from the V line and are located on the broken line 601. Also in this step, the intensity distributions 433, 453, and 413 are gradually lowered as the distance from the peaks 435, 455, and 415 increases in the left-right direction. One end of the intensity distribution 433 is located on the non-overlapping area 473 side, while the other end is located on the overlapping area 471 side, and the intensity at one end is higher than the intensity at the other end. Further, one end of the intensity distribution 453 is located on the overlapping area 471 side, while the other end of the intensity distribution 453 is located on the non-overlapping area 473 side, and the intensity at one end is higher than the intensity at the other end. In addition, one end of the intensity distribution 413 is located on the non-overlapping area 473 side of the right-side light distribution pattern 430, while the other end of the intensity distribution 413 is located on the non-overlapping area 473 side of the left-side light distribution pattern 450, and the intensity at one end is higher than the intensity at the other end. As described above, when controlling the current supplied to the light-emitting parts 43 of the left and right first lamps 40, the control unit 110 returns the control flow to step SP11.

(Step SP15)

Figure 13A:
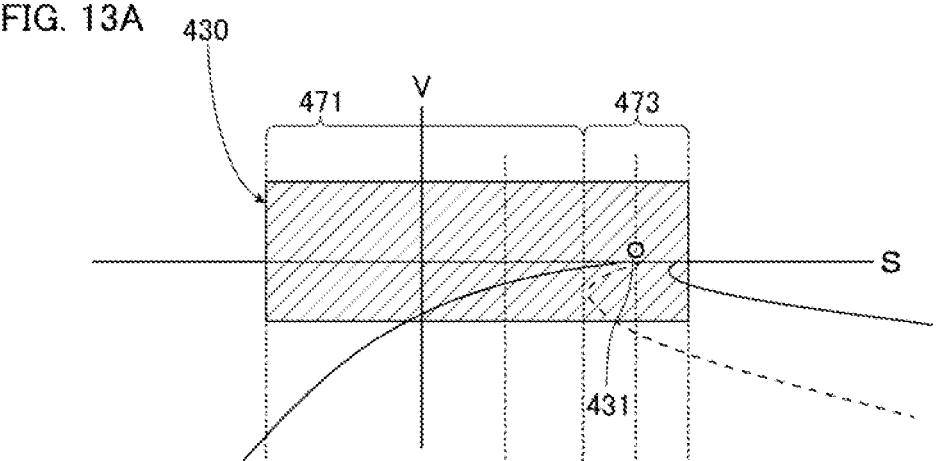
FIG. 13A is a view illustrating a position of a hot zone of a right-side light distribution pattern in a case where a steering angle is a second steering angle.
Figure 13B:
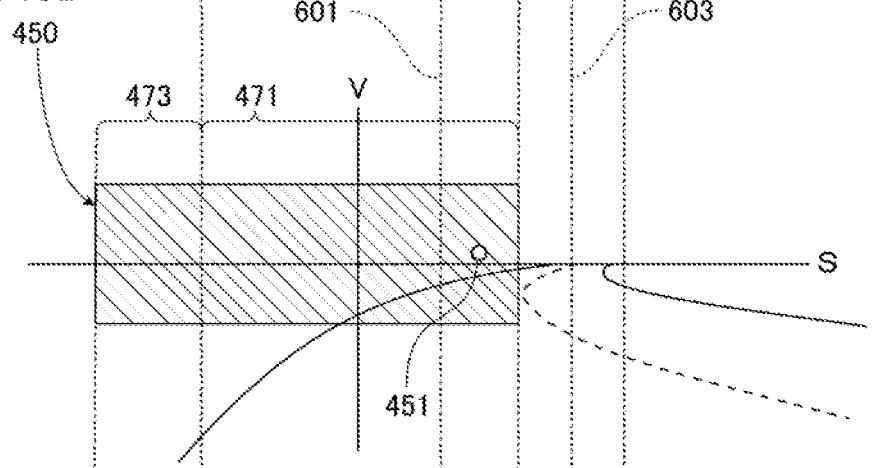
FIG. 13B is a view illustrating a position of a hot zone of a left-side light distribution pattern in a case where the steering angle is the second steering angle.
Figure 13C:
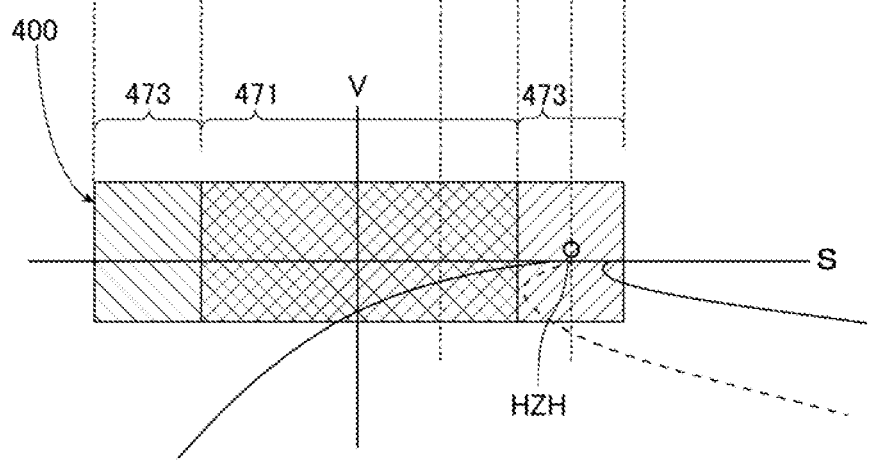
FIG. 13C is a view illustrating a position of a hot zone of a light distribution pattern in a case where the steering angle is the second steering angle.
Figure 14A:
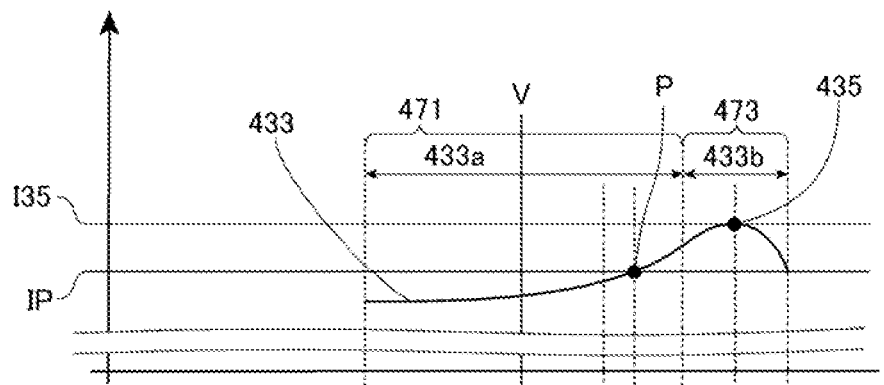
FIG. 14A is a view illustrating an intensity distribution of the right-side light distribution pattern illustrated in FIG. 13A.
Figure 14B:
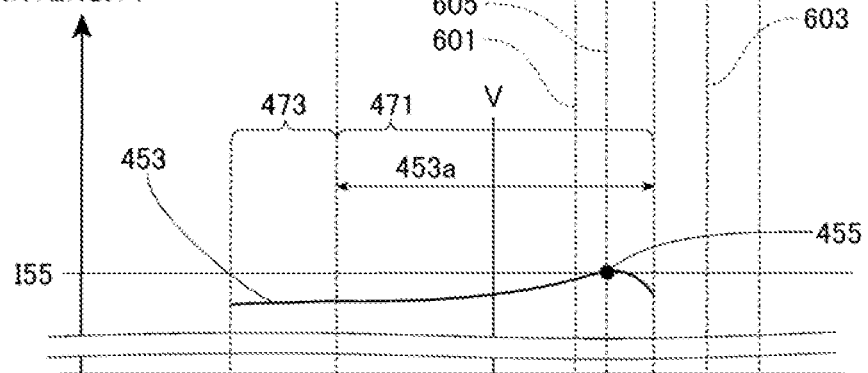
FIG. 14B is a view illustrating an intensity distribution of the left-side light distribution pattern illustrated in FIG. 13B.
Figure 14C:
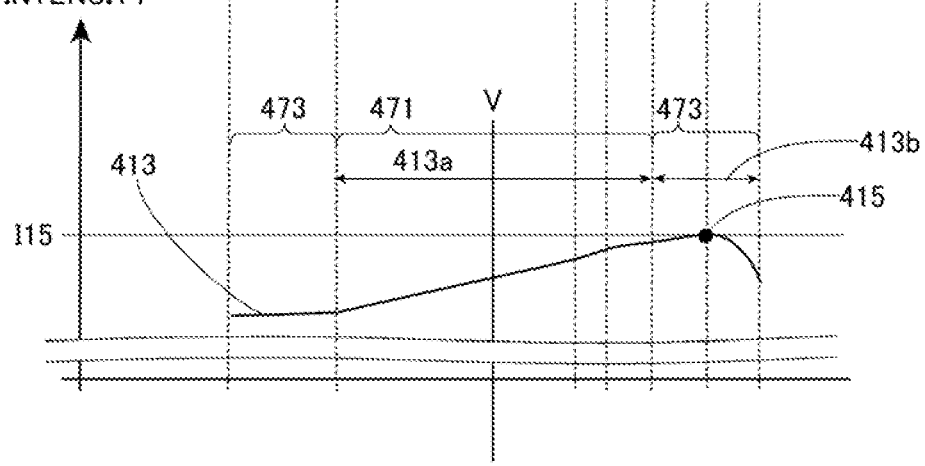
FIG. 14C is a view illustrating an intensity distribution of the light distribution pattern illustrated in FIG. 13C.

In this step, the control unit 110 performs a third operation. In the third operation, the steering angle becomes the second steering angle based on the signal from the steering sensor, and the control unit 110 controls the current supplied to the respective light-emitting parts 43 of the left-side first lamp 40 and to the respective light-emitting parts 43 of the right-side first lamp 40, based on the second steering angle. The second steering angle is an angle having a greater tilt in the clockwise direction than the first steering angle. The second steering angle is also an angle at which the right-side hot zone 431 is located in the non-overlapping area 473 of the right-side light distribution pattern 430 and the left-side hot zone 451 is located in the overlapping area 471. FIG. 13A is a view illustrating the position of the hot zone 431 in a case where the steering angle is the second steering angle; and FIG. 13B is a view illustrating the position of the hot zone 451 in a case where the steering angle is the second steering angle. FIG. 13C is a view illustrating the position of the hot zone HZH in a case where the steering angle is the second steering angle. The light distribution patterns 430, 450, and 400 illustrated in FIG. 13 are the same as the respective patterns illustrated in FIG. 8, and the positions of the light distribution patterns 430, 450, and 400 with respect to the V line and the H line are the same as the positions in FIG. 8. FIG. 14A is a view illustrating the intensity distribution 433 in a case where the steering angle is the second steering angle; and FIG. 14B is a view illustrating the intensity distribution 453 in a case where the steering angle is the second steering angle. FIG. 14C is a view illustrating the intensity distribution 413 in a case where the steering angle is the second steering angle. In FIGS. 13 and 14, the positions of the hot zones 431 and HZH in a case where the steering angle is the second steering angle are indicated by a broken line 603. The broken line 603 is located in the non-overlapping area 473 on the right-side light distribution pattern 430 side. As illustrated in FIG. 13, in the third operation, the hot zones 431 and HZH are located in the non-overlapping area 473 on the right-side light distribution pattern 430 side, and the hot zone 451 is located in the overlapping area 471. The broken line 601 illustrated in FIGS. 11 and 12 is also illustrated in FIGS. 13 and 14.

In the third operation, as illustrated in FIG. 13, the control unit 110 adjusts the current supplied to the respective light-emitting parts 43 of the right-side first lamp 40 such that the right-side hot zone 431 is further shifted from the V line to the right side and located on the broken line 603. Incidentally, in a case where the steering angle is the second steering angle, the upper side of the broken line 603 is located outside the left-side light distribution pattern 450. For this reason, even if the control unit 110 adjusts the current supplied to the respective light-emitting parts 43 of the left-side first lamp 40, the left-side hot zone 451 cannot be moved onto the broken line 603. For this reason, the control unit 110 adjusts the current supplied to the respective light-emitting parts 43 of the first lamp 40 of the left-side lamp unit 30b such that the left-side hot zone 451 is located between the V line and the right edge of the left-side light distribution pattern 450. The adjustment of the current will be described subsequently.

In a case where the steering angle is the second steering angle, because the right-side hot zone 431 is located on the broken line 603, the peak 435 of the intensity distribution 433 is located on the broken line 603 as illustrated in FIG. 14A. Also in this step, the intensity distribution 433 is gradually lowered as the distance from the peak 435 increases in the left-right direction. One end of the intensity distribution 433 is located on the non-overlapping area 473 side, the other end of the intensity distribution 433 is located on the overlapping area 471 side, and the intensity at one end is higher than the intensity at the other end.

In addition, in a case where the steering angle is the second steering angle, the left-side hot zone 451 is located between the V line and the right end of the left-side light distribution pattern 450. Therefore, as illustrated in FIG. 14B, the peak 455 of the intensity distribution 453 is located between the V line and the right end of the left-side light distribution pattern 450. Also in this step, the intensity distribution 453 is gradually lowered as the distance from the peak 455 increases in the left-right direction. One end of the intensity distribution 453 is located on the overlapping area 471 side, while the other end of the intensity distribution 453 is located on the non-overlapping area 473 side, and the intensity at one end is higher than the intensity at the other end.

Incidentally, in FIG. 14A, an intensity distribution overlapping the intensity distribution 453 in the intensity distribution 433 is illustrated as an intensity distribution 433a, and an intensity distribution not overlapping the intensity distribution 453 is illustrated as an intensity distribution 433b. The intensity distribution 433a is an intensity distribution in the overlapping area 471 of the intensity distribution 433, and the intensity distribution 433b is an intensity distribution in the non-overlapping area 473 of the intensity distribution 433. In FIG. 14B, an intensity distribution overlapping the intensity distribution 433 in the intensity distribution 453 is illustrated as an intensity distribution 453a. The intensity distribution 453a is also an intensity distribution in the overlapping area 471 of the intensity distribution 453, and is an intensity distribution to be synthesized with the intensity distribution 433a. In FIG. 14C, the intensity distribution in the overlapping area 471 of the intensity distribution 413 is illustrated as an intensity distribution 413a, and the intensity distribution in the non-overlapping area 473 is illustrated as an intensity distribution 413b. The intensity distribution 413a is an intensity distribution obtained by synthesizing the intensity distribution 433a and the intensity distribution 453a. In addition, because the intensity distribution 413b corresponds to the intensity distribution 433b, the peak 415 of the intensity distribution 413 corresponds to the peak 435 of the intensity distribution 433b. In FIG. 14, the intensity at the peak 435 is indicated as an intensity 135, and the intensity at the peak 415 corresponding to the peak 415 is indicated as an intensity 115. Because the peak 415 corresponds to the peak 435, the intensity 115 is the same as the intensity 135. In FIG. 14, the intensity at the peak 455 is indicated as the intensity 155. In FIG. 14, the intensity at the point P in the intensity distribution 433a is indicated as the intensity IP. A point P indicates an area overlapping the hot zone 451 in the right-side light distribution pattern 430, and the intensity IP is the light intensity in the area. Therefore, in the left-right direction of the intensity distributions 433 and 453, the distance between the V line and the point P is the same as the distance between the V line and the peak 455. Further, the point P is located in the same position as the peak 455 in the left-right direction as indicated by a broken line 605, and the first light having the intensity IP overlaps the first light having the intensity 155 in the light distribution pattern 400. The intensity IP is set lower than the intensity 135.

In the third operation, in a case where the steering angle is the second steering angle, which is greater than the first steering angle that is the prescribed angle, the control unit 110 controls the current supplied to the respective light-emitting parts 43 of the left-side first lamp 40 and the respective light-emitting parts 43 of the right-side first lamp 40 such that the hot zone 431 is located in the non-overlapping area 473 of the right-side light distribution pattern 430, the hot zone 451 is located in the overlapping area 471, and the intensity 135 at the peak 435 is higher than the sum of the intensity 155 at the peak 455 and the intensity IP at the point P. In this case, the control unit 110 adjusts the intensity 155 by adjusting the current supplied to the respective light-emitting parts 43 of the left-side first lamp 40 based on the intensity IP, such that the intensity 135 is higher than the sum of the intensity 155 and the intensity IP. Hereinafter, the intensity 135 may be referred to as a first intensity, the intensity 155 may be referred to as a second intensity, and the intensity Ip may be referred to as a third intensity. As described above, the intensity distribution 453 including the intensity 155 adjusted in this manner is gradually lowered as the distance from the peak 455 increases in the left-right direction. The intensity distribution 413 including the intensity 115 is formed through the synthesis of the intensity distribution 433 and the intensity distribution 453. The intensity distribution 413 gradually decreases as the distance from the peak 415 increases in the left-right direction. In addition, the intensity distribution 413a of the intensity distribution 413 is an intensity distribution obtained by synthesizing the intensity distribution 433a of the intensity distribution 433 and the intensity distribution 453a of the intensity distribution 453. As described above, when controlling the current supplied to the light-emitting parts 43 of the left and right first lamps 40, the control unit 110 returns the control flow to step SP11.

As described above, the vehicle headlights 20 according to the present embodiment is equipped with a right-side first lamp 40 disposed on the right side of the vehicle 10, a left-side first lamp 40 disposed on the left side of the vehicle 10, and the control unit 110. The right-side first lamp 40 includes a plurality of light-emitting parts 43 as light-emitting parts, and forms the right-side light distribution pattern 430, which is part of the high-beam light distribution pattern 930, by using the light from the plurality of light-emitting parts 43. The left-side first lamp 40 includes a plurality of light-emitting parts 43 as light-emitting parts, and forms the left-side light distribution pattern 450, which is another part of the high-beam light distribution pattern 930, by using the light from the plurality of light-emitting parts 43 on the left side of the right-side light distribution pattern 430. The control unit 110 controls the current supplied to the respective light-emitting parts 43 of the left-side first lamp 40 and the current supplied to the respective light-emitting parts 43 of the right-side first lamp 40 such that the hot zone 431, which has the highest light intensity in the right-side light distribution pattern 430, and the hot zone 451, which has the highest light intensity in the left-side light distribution pattern 450, each move left and right in the light distribution patterns 430 and 450, respectively, by tracking the steering angle of the vehicle 10. Each of the right-side light distribution pattern 430 and the left-side light distribution pattern 450 includes an overlapping area 471 in which the right-side light distribution pattern 430 and the left-side light distribution pattern 450 overlap each other, and a non-overlapping area 473 in which the right-side light distribution pattern 430 and the left-side light distribution pattern 450 do not overlap each other. For example, in a case where the vehicle 10 is turning right, the first light distribution pattern is then the right-side light distribution pattern 430, and the second light distribution pattern is the left-side light distribution pattern 450. In a case where the steering angle is greater than the first steering angle that is the prescribed angle, the control unit 110 controls the current supplied to the respective light-emitting parts 43 of the left-side first lamp 40 and the current supplied to the respective light-emitting parts 43 of the right-side first lamp 40 such that the hot zone 431, which is the first area of the right-side light distribution pattern 430, is located in the non-overlapping area 473 of the right-side light distribution pattern 430, the hot zone 451, which is the second area of the left-side light distribution pattern 450, is located in the overlapping area 471, and the intensity 135, which is the first intensity in the hot zone 431 is higher than the sum of the intensity 155, which is the second intensity in the hot zone 451, and the intensity IP, which is the third intensity.

For example, in a case where the sum of the intensity 155 and the intensity IP is equal to or greater than the intensity 135, two peaks 415 may be formed in the intensity distribution 413 of the light distribution pattern 400. When the two peaks 415 are formed, the area, in the light distribution pattern 400, corresponding to the valley of the intensity distribution located between the two peaks 415 is darker than the areas on both sides of the valley. Incidentally, in case where the vehicle 10 is turning, the driver tends to direct their line of sight to the side where the vehicle 10 is turning in order to see ahead. In a case where the steering angle is greater than a first steering angle that is the prescribed angle, when the area corresponding to the aforementioned valley and the area corresponding to both sides of the valley are located in front of the line of sight of the driver, the driver may recognize that part of the area in front of the line of sight has become darker than other parts and feel uncomfortable, and the visibility on the side where the vehicle 10 is turning may be reduced. In particular, when the valley is formed like a step, it is even more difficult to visually recognize. However, in the above configuration, because the intensity 135 is higher than the sum of the intensity 155 and the intensity IP, the intensity distribution 413 of the light distribution pattern 400 can be gradually lowered as the distance from the peak 415 increases in the left-right direction. Therefore, formation of the valley can be suppressed, the driver can be prevented from feeling uncomfortable, and reduced visibility on the side where the vehicle 10 is turning can be suppressed.

Although the relationships between the intensity 135, the intensity IP, and the intensity 155 in the intensity distributions 433 and 453 has been described above, the relationships between the respective intensities of the intensity distributions 433, 453, and 413 are not limited thereto, and other relationships will be described below.

In the vehicle headlights 20, in a case where the steering angle is greater than the first steering angle, the control unit 110 may control the current supplied to the respective light-emitting parts 43 of the left-side first lamp 40 such that the intensity 135 is higher than the light intensity in the entire area of the overlapping area 471 of the light distribution pattern 400. Therefore, the intensity 135 is higher than each intensity in the intensity distribution 413a. In this case, the control unit 110 adjusts the intensity distribution 453a by adjusting the current supplied to the respective light-emitting parts 43 of the left-side first lamp 40 based on the intensity distribution 433a, such that the intensity 135 is higher than each intensity in the intensity distribution 413a.

In a case where the steering angle is greater than the first steering angle and the light intensity in the overlapping area 471 of the light distribution pattern 400 is equal to or greater than the intensity 135, in the intensity distribution 413 of the light distribution pattern 400, the peak 415 is formed on the center side of the light distribution pattern 400 rather than the side where the vehicle 10 is turning. In this case, from the viewpoint of the driver, the center side of the light distribution pattern 400 becomes brighter than the side where the vehicle 10 is turning and toward which the line of sight tends to be directed in a case where the vehicle is turning, and hence it becomes difficult to visually recognize the side where the vehicle 10 is turning. However, as in the above configuration, in a case where the intensity 135 is higher than the light intensity in the entire area of the overlapping area 471 of the light distribution pattern 400, in the light distribution pattern 400, the side where the vehicle 10 is turning can be brighter, and the side where the vehicle 10 is turning in the light distribution pattern 400 can be brighter than the center side of the light distribution pattern 400. Therefore, the side where the vehicle 10 is turning can be easily visually recognized. Note that in a case where the steering angle is greater than the first steering angle, the control unit 110 need not control the current supplied to the respective light-emitting parts 43 of the left-side first lamp 40 such that the intensity 135 is higher than the light intensity in the entire area of the overlapping area 471 of the light distribution pattern 400.

Furthermore, in the vehicle headlights 20, in a case where the steering angle is greater than the first steering angle, the control unit 110 may control the current supplied to the respective light-emitting parts 43 of the left-side first lamp 40 such that the light intensity in the overlapping area 471 of the right-side light distribution pattern 430 is lower than the light intensity in the overlapping area 471 of the left-side light distribution pattern 450. In this case, the control unit 110 adjusts the intensity distribution 453a by adjusting the current supplied to the respective light-emitting parts 43 of the left-side first lamp 40, and makes the intensity distribution 453a of the left-side light distribution pattern 450 lower than the intensity distribution 433a of the right-side light distribution pattern 430.

In a case where the steering angle is greater than the first steering angle and the light intensity in the overlapping area 471 of the right-side light distribution pattern 430 is equal to or greater than the light intensity in the overlapping area 471 of the left-side light distribution pattern 450, in the light distribution pattern 400, the center side of the light distribution pattern 400 becomes brighter, from the viewpoint of the driver, than the side where the vehicle 10 is turning in the light distribution pattern 400, and hence it may be difficult to visually recognize the side where the vehicle 10 is turning. In comparison with this case, in a case where the light intensity in the overlapping area 471 of the right-side light distribution pattern 430 is lower than the light intensity in the overlapping area 471 of the left-side light distribution pattern 450, the side where the vehicle 10 is turning in the light distribution pattern 400 can be brighter than the center side of the light distribution pattern 400. Therefore, in comparison with a case where the light intensity in the overlapping area 471 of the right-side light distribution pattern 430 is equal to or greater than the light intensity in the overlapping area 471 of the left-side light distribution pattern 450, the side where the vehicle 10 is turning can be easily visually recognized. Note that, in a case where the steering angle is greater than the first steering angle, the control unit 110 need not control the current supplied to the respective light-emitting parts 43 of the left-side first lamp 40 such that the light intensity in the overlapping area 471 of the right-side light distribution pattern 430 is lower than the light intensity in the overlapping area 471 of the left-side light distribution pattern 450.

In addition, in the vehicle headlights 20, in a case where the steering angle is greater than the first steering angle, the control unit 110 may control the current supplied to the respective light-emitting parts 43 of the right-side first lamp 40 such that the intensity 135 becomes high in comparison with a case where the steering angle is equal to or less than the first steering angle and the hot zone 431 is located in the overlapping area 471. In this case, the control unit 110 adjusts the intensity 135 by adjusting the current supplied to each light-emitting part 43 of the right-side first lamp 40.

In a case where the hot zone HZH, which is the third area of the light distribution pattern 400, is located in the overlapping area 471, the intensity 115 in the hot zone HZH is the sum of the intensity 135 and the intensity 155. However, in a case where the hot zone HZH is located in the non-overlapping area 473 of the right-side light distribution pattern 430, the intensity 115 is the intensity 135. If the intensity 135 is the same between the case where the hot zone HZH is located in the overlapping area 471 and the case where the hot zone HZH is located in the non-overlapping area 473, the intensity 115 is lower in a case where the hot zone HZH is located in the non-overlapping area 473 than in a case where the hot zone HZH is located in the overlapping area 471. Therefore, it is difficult to visually recognize the side where the vehicle 10 is turning. However, in the above configuration, in a case where the hot zone HZH is located in the non-overlapping area 473, the intensity 135 is higher than in a case where the hot zone HZH is located in the overlapping area 471. For this reason, in the light distribution pattern 400, the side where the vehicle 10 is turning can be bright, and the side where the vehicle 10 is turning can be easily visually recognized. In addition, in a case where the control unit 110 controls the current supplied to the respective light-emitting parts 43 of the right-side first lamp 40 such that the hot zone 431 is located in the non-overlapping area 473 of the right-side light distribution pattern 430, the control unit 110 may control the current supplied to the respective light-emitting parts 43 of the right-side first lamp 40 such that the intensity 135 becomes higher than the sum of the intensity 135 and the intensity 155 in a case where the hot zones 431 and 451 are located in the overlapping area 471. As a result, for example, the side where the vehicle 10 is turning in the light distribution pattern 400 in a case where the steering angle is greater than the first steering angle and the vehicle 10 is turning can be made brighter than the center side in the light distribution pattern 400 in a case where the vehicle 10 is traveling straight. Therefore, even when the vehicle 10 changes from a state of traveling straight to a turning state, the destination of the line of sight is prevented from becoming dark, and the side where the vehicle 10 is turning can be easily visually recognized. Note that, in a case where the steering angle is greater than the first steering angle, the control unit 110 need not control the current supplied to the respective light-emitting parts 43 of the right-side first lamp 40 such that the intensity 135 becomes high in comparison with the case where the steering angle is equal to or less than the first steering angle and the hot zone 431 is located in the overlapping area 471.

In addition, in the vehicle headlights 20, in a case where the steering angle is greater than the first steering angle, the control unit 110 may control the current supplied to the respective light-emitting parts 43 of the right-side first lamp 40 such that the light intensity in the non-overlapping area 473 of the right-side light distribution pattern 430 becomes high, in comparison with the case where the steering angle is equal to or less than the first steering angle and the hot zone 431 is located in the overlapping area 471 of the right-side light distribution pattern 430. In this case, the control unit 110 adjusts the current supplied to the respective light-emitting parts 43 of the right-side first lamp 40 to increase the intensity distribution 433b in comparison with the case where the hot zone 431 is located in the overlapping area 471 of the right-side light distribution pattern 430. Note that, in a case where the steering angle is greater than the first steering angle, the control unit 110 need not control the current supplied to the respective light-emitting parts 43 of the right-side first lamp 40 such that the light intensity in the non-overlapping area 473 of the right-side light distribution pattern 430 becomes high, in comparison with the case where the steering angle is equal to or less than the first steering angle and the hot zone 431 is located in the overlapping area 471 of the right-side light distribution pattern 430.

In the above embodiment, the case where the vehicle 10 turns right has been described as an example. However, in a case where the vehicle 10 turns left, the control unit 110 may control the left and right first lamps 40 bilaterally symmetrically with respect to the case where the vehicle 10 turns right. The prescribed angle of the steering angle may be the reference steering angle instead of the first steering angle, and in a case where the steering angle is the first steering angle, which is greater than the reference steering angle, the control unit 110 may control the left and right first lamps 40 as described above similarly to the case where the steering angle is the second steering angle, which is greater than the one steering angle.

Figure 15:
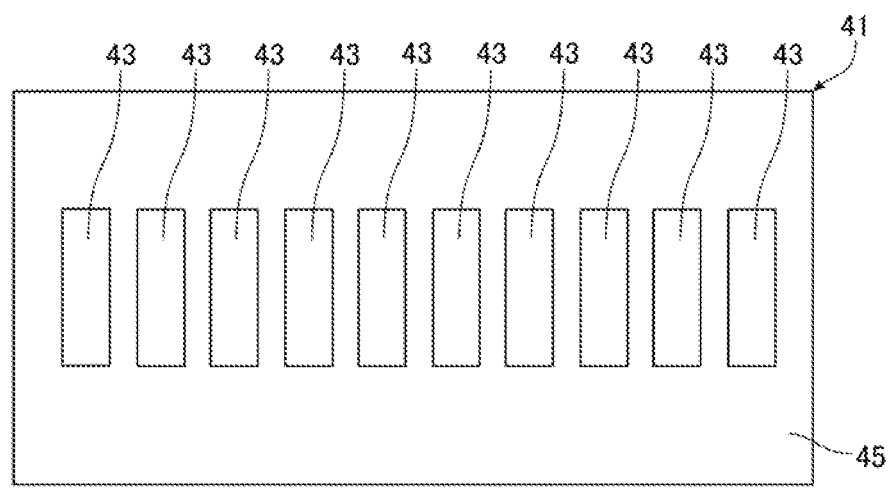
FIG. 15 is a front view schematically illustrating a first light source part of a modified example.

In addition, the first light source part 41 of the lamp units 30a and 30b is not limited to a micro LED array, and may be a so-called LED array. FIG. 15 is a front view schematically illustrating the first light source part 41 in the case of an LED array. As illustrated in FIG. 15, each of the light-emitting parts 43 is a substantially rectangular LED in which an emission surface that emits the first light forward is elongated in the up-down direction. The emission surface of the respective light-emitting parts 43 is made greater than the emission surface of the light-emitting parts 43 in a case where the first light source part 41 is a micro LED array. In a case where the first light source part 41 is an LED array, the respective light-emitting parts 43 stand in a row in the left-right direction and are arranged in an array.

FIG. 15 illustrates an example in which the number of the light-emitting parts 43 is ten, but the number of the light-emitting parts 43 is not particularly limited as long as the number is two or more.

Even in a case where the first light source part 41 is an LED array, the size and shape of the light distribution pattern 400 change according to the selection of the light-emitting parts 43 emitting the first light. The intensity distribution of the first light in the light distribution pattern 400 is adjusted by adjusting the amount of the first light emitted from each light-emitting part 43.

The right-side light distribution pattern 430 and the left-side light distribution pattern 450 in a case where the first light source part 41 is an LED array are the same as the right-side light distribution pattern 430 and the left-side light distribution pattern 450 in a case where the first light source part 41 is a micro LED array.

As described above, the present invention has been described by taking the above-described embodiments and modified example as examples, but the present invention is not limited thereto.

For example, the light-emitting parts 43 may be self-emitting light-emitting parts that emit the first light, and may be light-emitting parts other than LEDs or LDs. In this case, the control unit 110 may control the voltage to each light-emitting part 43 instead of controlling the current. The power to each light-emitting part 43 is controlled by controlling the voltage. As a result, the amount of light emitted from each light-emitting part 43 is adjusted, and the intensity distribution of the light in the light distribution pattern is adjusted.

The configuration of the first lamp 40 may be a configuration in which light emitted from a light source is diffracted using LCOS (Liquid Crystal On Silicon) to form a desired light distribution pattern and light is emitted forward. In addition, the configuration of the first lamp 40 may be a configuration in which the light emitted from the light source is reflected by a digital mirror device (DMD), or may be a configuration in which the light emitted from the light source is transmitted through the liquid crystal panel. In the case of LCOS, it can be understood that each of a plurality of liquid crystal elements arranged in a matrix is a light-emitting part that emits light by reflecting the light from the light source. In the case of a DMD, because each of the plurality of mirrors arranged in a matrix reflects light from the light source and emits light, it can be understood that each mirror is a light-emitting part. In the case of a liquid crystal panel, it can be understood that each of a plurality of liquid crystal elements arranged in a matrix is a light-emitting part that emits light by transmitting the light from the light source. In the case of LCOS, a DMD, or a liquid crystal panel, the voltage applied to each light-emitting part is controlled. Power to each light-emitting part is controlled using voltage control. As a result, the light reflection state of each liquid crystal element of the LCOS is changed, the reflection direction of each DMD mirror is changed, or the transmittance of each liquid crystal element in the liquid crystal panel is changed. Due to the change, the desired light distribution pattern is formed, the amount of light emitted from each light-emitting part is adjusted, and the light intensity distribution in the light distribution pattern is adjusted.

One of the first light source part 41 of the lamp unit 30a and the first light source part 41 of the lamp unit 30b may be configured as a micro LED array, and the other may be configured as an LED array.

The present invention provides vehicle headlights 20 capable of suppressing reduced visibility on a side where a vehicle is turning in a case where electronic swivel is performed, and the vehicle headlights can be used in fields such as vehicle headlights for automobiles and the like.

The invention claimed is:

1. Vehicle headlights, comprising:
a right-side lamp having a plurality of light-emitting parts, disposed on a right side of a vehicle, and forming, using light from the plurality of light-emitting parts, a right-side light distribution pattern constituting part of a high-beam light distribution pattern;
a left-side lamp having a plurality of light-emitting parts, disposed on a left side of the vehicle, and forming, using light from the plurality of light-emitting parts on a left side of the right-side light distribution pattern, a left-side light distribution pattern constituting another part of the high-beam light distribution pattern; and
a control unit that controls power supplied to each of the light-emitting parts of the right-side lamp and power supplied to each of the light-emitting parts of the left-side lamp such that an area having the highest light intensity in the right-side light distribution pattern and an area having the highest light intensity in the left-side light distribution pattern each move left and right in the respective light distribution patterns by tracking a steering angle of the vehicle,
wherein each of the right-side light distribution pattern and the left-side light distribution pattern includes an overlapping area where the right-side light distribution pattern and the left-side light distribution pattern overlap each other and a non-overlapping area where the right-side light distribution pattern and the left-side light distribution pattern do not overlap each other, and
wherein, in a case where the steering angle is greater than a prescribed angle, the control unit controls the power supplied to the respective light-emitting parts of the right-side lamp and the power supplied to the respective light-emitting parts of the left-side lamp such that: a first area, which has the highest light intensity in a first light distribution pattern, which is a light distribution pattern on a side where the vehicle is turning among the right-side light distribution pattern and the left-side light distribution pattern, is located in the non-overlapping area of the first light distribution pattern; a second area, which has the highest light intensity in a second light distribution pattern, which is a light distribution pattern on a side opposite to the side where the vehicle is turning among the right-side light distribution pattern and the left-side light distribution pattern, is located in the overlapping area; and a first intensity of light in the first area becomes greater than the sum of a second intensity of light in the second area and a third intensity of light in an area overlapping the second area within the first light distribution pattern.

2. The vehicle headlights according to claim 1,
wherein, in a case where the steering angle is greater than the prescribed angle, the control unit controls the power supplied to the respective light-emitting parts of the lamp on the opposite side, of the right-side lamp and the left-side lamp, such that the first intensity becomes greater than the light intensity in the overlapping area of the light distribution pattern including the first light distribution pattern and the second light distribution pattern.

3. The vehicle headlights according to claim 2,
wherein, in a case where the steering angle is greater than the prescribed angle, the control unit controls the power supplied to the respective light-emitting parts of the lamp on the opposite side, such that the light intensity in the overlapping area of the first light distribution pattern becomes lower than the light intensity in the overlapping area of the second light distribution pattern.

4. The vehicle headlights according to claim 1,
wherein, in a case where the steering angle is greater than the prescribed angle, the control unit controls the power supplied to the respective light-emitting parts of the lamp on the side where the vehicle is turning, among the right-side lamp and the left-side lamp, such that the first intensity becomes greater than in a case where the steering angle is equal to or less than the prescribed angle.

5. The vehicle headlights according to claim 4,
wherein, in a case where the steering angle is greater than the prescribed angle, the control unit controls the power supplied to the respective light-emitting parts of the lamp on the turning side, such that the light intensity in the non-overlapping area of the first light distribution pattern becomes greater than in a case where the steering angle is equal to or less than the prescribed angle and the first area is located in the overlapping area of the first light distribution pattern.

6. The vehicle headlights according to claim 1,
wherein the plurality of light-emitting parts of the right-side lamp and the plurality of light-emitting parts of the left-side lamp are arranged in a matrix array.

7. The vehicle headlights according to claim 1,
wherein the plurality of light-emitting parts of the right-side lamp and the plurality of light-emitting parts of the left-side lamp are arranged in an array.

* * * * *